US008319749B2

United States Patent
Harada et al.

(10) Patent No.: US 8,319,749 B2
(45) Date of Patent: Nov. 27, 2012

(54) IMAGE PICKUP APPARATUS, DISPLAY-AND-IMAGE-PICKUP APPARATUS AND IMAGE PICKUP PROCESSING APPARATUS

(75) Inventors: Tsutomu Harada, Kanagawa (JP); Shinya Hashimoto, Kanagawa (JP); Tadashi Maekawa, Kanagawa (JP); Naoya Okada, Tokyo (JP); Kazunori Yamaguchi, Kanagawa (JP); Mitsuru Tateuchi, Kanagawa (JP); Ryoichi Tsuzaki, Kanagawa (JP); Go Yamanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 646 days.

(21) Appl. No.: 12/298,094

(22) PCT Filed: Feb. 19, 2008

(86) PCT No.: PCT/JP2008/052749
§ 371 (c)(1),
(2), (4) Date: Oct. 29, 2009

(87) PCT Pub. No.: WO2008/102767
PCT Pub. Date: Aug. 28, 2008

(65) Prior Publication Data
US 2010/0045811 A1    Feb. 25, 2010

(51) Int. Cl.
*G06F 3/042* (2006.01)
(52) U.S. Cl. .................. 345/175; 345/173; 178/18.02; 178/18.11; 715/700
(58) Field of Classification Search ............ 345/156, 345/173–178; 715/700; 178/18.01–18.09, 178/18.11
See application file for complete search history.

(56) References Cited

U.S. PATENT DOCUMENTS

| | | | |
|---|---|---|---|
| 5,511,148 A * | 4/1996 | Wellner | 358/1.6 |
| 7,190,336 B2 | 3/2007 | Fujisawa | |
| 7,515,141 B2 * | 4/2009 | Kobayashi | 345/173 |
| 7,538,894 B2 * | 5/2009 | Kobayashi | 356/614 |
| 8,085,251 B2 * | 12/2011 | Harada et al. | 345/173 |
| 8,149,221 B2 * | 4/2012 | Newton | 345/173 |
| 8,188,987 B2 * | 5/2012 | Harada et al. | 345/175 |
| 2005/0163339 A1 | 7/2005 | Watanabe et al. | |
| 2006/0044282 A1 | 3/2006 | Pinhanez et al. | |
| 2006/0077186 A1 * | 4/2006 | Park et al. | 345/173 |
| 2006/0170658 A1 * | 8/2006 | Nakamura et al. | 345/173 |
| 2006/0214892 A1 * | 9/2006 | Harada et al. | 345/81 |
| 2006/0232568 A1 * | 10/2006 | Tanaka et al. | 345/175 |
| 2007/0013646 A1 * | 1/2007 | Harada | 345/102 |
| 2008/0055266 A1 * | 3/2008 | Harada et al. | 345/173 |
| 2008/0231564 A1 * | 9/2008 | Harada et al. | 345/81 |

(Continued)

FOREIGN PATENT DOCUMENTS
JP    2002-351615    12/2002
(Continued)

*Primary Examiner* — Joe H Cheng
(74) *Attorney, Agent, or Firm* — K&L Gates LLP

(57) ABSTRACT

An image pickup apparatus capable of easily improving the detection accuracy of a touching or proximity object is provided. An offset noise (a reset image R) is obtained by an image pickup process in a state (a reset state) in which an image pickup device is initialized. Moreover, a fingertip extraction process is performed in consideration of the offset noise on the basis of a picked-up image (a shadow image A or a display light-using image B) which is obtained by picking up an image of a proximity object to obtain object information about the proximity object. While an offset noise in the apparatus is easily reduced, object information about the proximity object can be obtained.

18 Claims, 34 Drawing Sheets

U.S. PATENT DOCUMENTS

2010/0271336 A1 * 10/2010 Harada et al. ................. 345/175

FOREIGN PATENT DOCUMENTS

| | | |
|---|---|---|
| JP | 2004-127272 | 4/2004 |
| JP | 2005-215905 | 8/2005 |
| JP | 2008-511069 | 4/2008 |
| WO | 2007013272 | 2/2007 |

* cited by examiner

| | DIFFERENTIAL IMAGE FINGETIP EXTRACTION PROCESS | SHADOW IMAGE FINGERTIP EXTRACTION PROCESS |
|---|---|---|
| ENVIRONMENTAL CHANGE | ○ | △ (OPERATE AT CERTAIN OR HIGHER BRIGHTNESS) |
| BACKLIGHT OFF (UNDER SUNLIGHT) | × | ○ |
| DEGREE OF DISPLAY FREEDOM | △ (PREVENT BY COLOR SPECIFICATIONS) | ○ |
| BLACK GLOVE | × | ○ (BRIGHT ENVIRONMENT) |
| 50Hz FLUORESCENT LIGHT | △ (OK WHEN IT IS DARK) | △ (OK WHEN IT IS BRIGHT) |
| SPOTLIGHT | ○ | △ (DEPENDING ON SURROUNDING BRIGHTNESS) |
| SUNBEAMS THROUGH FOLIAGE | △ (WEAK ON MOVEMENT. DEPENDING ON INTENSITY) | ○ (OK WHEN SUNBEAMS ARE NOT SHARP) |
| STYLUS | △ (REFLECTION BALLPOINT PEN, DISPLAY COLOR SPECIFIED) | △ (DETECTION ALGORITHM IS NECESSARY) |

FIG. 22

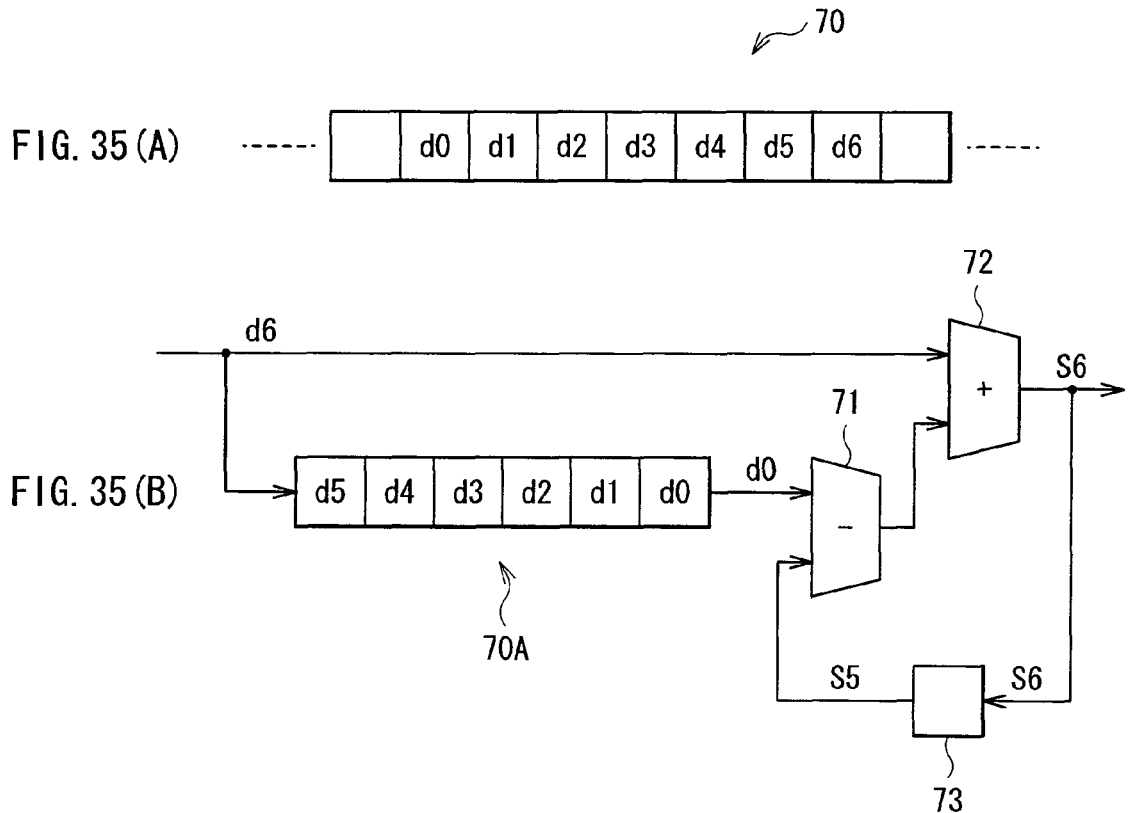

IMAGE PICKUP APPARATUS, DISPLAY-AND-IMAGE-PICKUP APPARATUS AND IMAGE PICKUP PROCESSING APPARATUS

CROSS REFERENCE TO RELATED APPLICATIONS

The present application claims priority to Japanese Patent Document No. 2007-043317 filed on Feb. 23, 2007, the disclosure of which is herein incorporated by reference.

BACKGROUND

The present invention relates to an image pickup apparatus and a display-and-image-pickup apparatus obtaining information such as the position of an object touching or in proximity to a panel, and an image pickup processing apparatus applied to such an image pickup apparatus.

Techniques of detecting the position or the like of an object touching or in proximity to a surface of an apparatus have been heretofore known. Among them, as a typical and widespread technique, a display including a touch panel capable of detecting the position or the like of an object touching or in proximity to a display surface is cited.

There are various types of touch panels, but as a commonly used type, a touch panel of a type detecting capacitance is cited. When a finger touches the touch panel of this kind, the touch panel captures a change in a surface charge of the panel to detect the position or the like of an object. Therefore, when such a touch panel is used, users can intuitively operate the touch panel.

Moreover, the applicant of the invention has proposed a display including a display section (a display image pickup panel) which has a display function of displaying an image and an image pickup function (detection function) of picking up an image of an object (detecting an object) in Patent Document 1, for example.

[Patent Document 1] Japanese Unexamined Patent Application Publication No. 2004-127272

SUMMARY

When a display described in the above-described Patent Document 1 is used, for example, in the case where an object such as a finger touches or comes in proximity to a display image pickup panel, the position or the like of the object can be detected on the basis of an image picked up by using display light reflected by the object. Therefore, when this display is used, the position or the like of the object can be detected with a simple configuration without separately arranging a component such as a touch panel on a display image pickup panel.

Moreover, more typically, it is considered that in an image pickup apparatus which includes an image pickup panel having only an image pickup function, the position or the like of the object can be detected by picking up an image of the object by using external light instead of the above-described display light reflected by the object.

By the way, in the case where the position or the like of the object is detected on the basis of a picked-up image in such a manner, offset variations among image pickup devices, offset variations in peripheral circuitry such as an output amplifier or an amplifier, and the like become issues. It is because when a noise (an offset noise) is generated in the picked-up image due to these offset variations, the detection accuracy of the position or the like of the object may decline, or detection in itself may become difficult.

Therefore, a method of storing an image picked up when an image pickup apparatus is covered with a black box or the like so that an image pickup device is not exposed to light, and then removing an offset noise by removing the image from an normal picked-up image is considered; however, an user is forced to perform an operation of obtaining a picked-up image when the environment around the image pickup apparatus is in a dark state, so a method of using the image pickup apparatus is very complicated, and is not practical.

Further, it is considered that in a step of manufacturing the image pickup apparatus, an initial offset noise is stored as an image in advance; however, it is expected that even if such an image is used, an offset noise becomes unable to be removed sufficiently due to a change in use environment or a temporal change.

Thus, in the techniques in related arts, it is difficult to easily reduce an offset noise in an apparatus and to improve the detection accuracy of an object touching or in proximity to a panel.

In view of the foregoing, it is an object of the invention to provide an image pickup apparatus, a display-and-image-pickup apparatus and an image pickup processing apparatus capable of easily improving the detection accuracy of an object touching or in proximity to a panel.

An image pickup apparatus according to the invention includes: an image pickup panel including a plurality of image pickup devices; an image pickup control means for controlling the image pickup devices so as to obtain an offset noise by an image pickup process in a state in which the image pickup devices are initialized; and an image processing means for obtaining object information as information about at least one of the position, the shape and the size of a proximity object in consideration of the offset noise on the basis of a picked-up image which is obtained by picking up an image of the proximity object. Herein, "a state in which the image pickup devices are initialized" means a state in which a charge accumulated in the image pickup devices is discharged, and the charge amount is initialized (reset). Moreover, "an offset noise" means a specific noise including not only a noise due to offset variations among image pickup devices but also a noise due to peripheral circuitry around the image pickup devices in the image pickup panel. Further, "a proximity object" means not only a literally proximity object but also an object in a touch state.

A display-and-image-pickup apparatus according to the invention includes: a display image pickup panel including a plurality of display devices and a plurality of image pickup devices; an image pickup control means for controlling the image pickup devices so as to obtain an offset noise by an image pickup process in a state in which the image pickup devices are initialized; an image processing means for obtaining object information as information about at least one of the position, the shape and the size of a proximity object in consideration of the offset noise on the basis of a picked-up image which is obtained by picking up an image of the proximity object; and a display control means for controlling display devices so that the obtained object information is displayed on the display image pickup panel.

An image pickup processing apparatus according to the invention is a processing apparatus applied to an image pickup panel including a plurality of image pickup devices, and includes: an image pickup control means for controlling the image pickup devices so as to obtain an offset noise by an image pickup process in a state in which the image pickup devices are initialized; and an image processing means for obtaining object information as information about at least one of the position, the shape and the size of a proximity object in consideration of the offset noise on the basis of a picked-up image which is obtained by picking up an image of the proximity object.

In the image pickup apparatus, the display-and-image-pickup apparatus and the image pickup processing apparatus according to the invention, the offset noise is obtained by the image pickup process in a state in which the image pickup devices are initialized. Then, object information about the proximity object is obtained in consideration of the offset noise on the basis of a picked-up image which is obtained by picking up an image of the proximity object.

In the image pickup apparatus according to the invention, the above-described image processing means may obtain object information in consideration of the above-described offset noise on the basis of a shadow image which is obtained by picking up an image of a shadow of the proximity object. In addition, "a shadow image" is an image which is obtained by picking up an image of a shadow by external light, and means an image obtained without using illumination light (or display light) from the image pickup panel. In the case of such a configuration, for example, even if illumination light or display light is not emitted from the image pickup panel, object information can be obtained. Moreover, irrespective of the intensity or the like of the illumination light or the display light, object information is obtained.

Moreover, the above-described image processing means may obtain object information in consideration of the above-described offset noise on the basis of the above-described shadow image and an illumination-light-using image which is obtained by picking up an image of the proximity object through the use of illumination light from the image pickup panel In the case of such a configuration, for example, even if the environment is dark and external light is not obtained, the object information can be obtained. Therefore, irrespective of use conditions at the time, object information can be obtained.

In the image pickup apparatus, the display-and-image-pickup apparatus or the image pickup processing apparatus according to the invention, the offset noise is obtained by the image pickup process in a state in which the image pickup devices are initialized, and object information about the proximity object is obtained in consideration of the offset noise on the basis of a picked-up image which is obtained by picking up an image of the proximity object, so while the offset noise in the apparatus is easily reduced, object information about the proximity object can be obtained. Therefore, the detection accuracy of a touching or proximity object can be easily improved.

Additional features and advantages of the present invention are described in, and will be apparent from, the following Detailed Description and the Figures.

BRIEF DESCRIPTION OF THE FIGURES

FIG. 22 is an illustration for describing a comparison between the differential image fingertip extraction process and the shadow image fingertip extraction process.

FIG. 35 is an illustration for describing the moving average image producing process according to the modification example of the invention.

DETAILED DESCRIPTION

A best mode for carrying out the invention (hereinafter simply referred to as embodiment) will be described in detail below referring to the accompanying drawings.

First Embodiment

Figure 1:
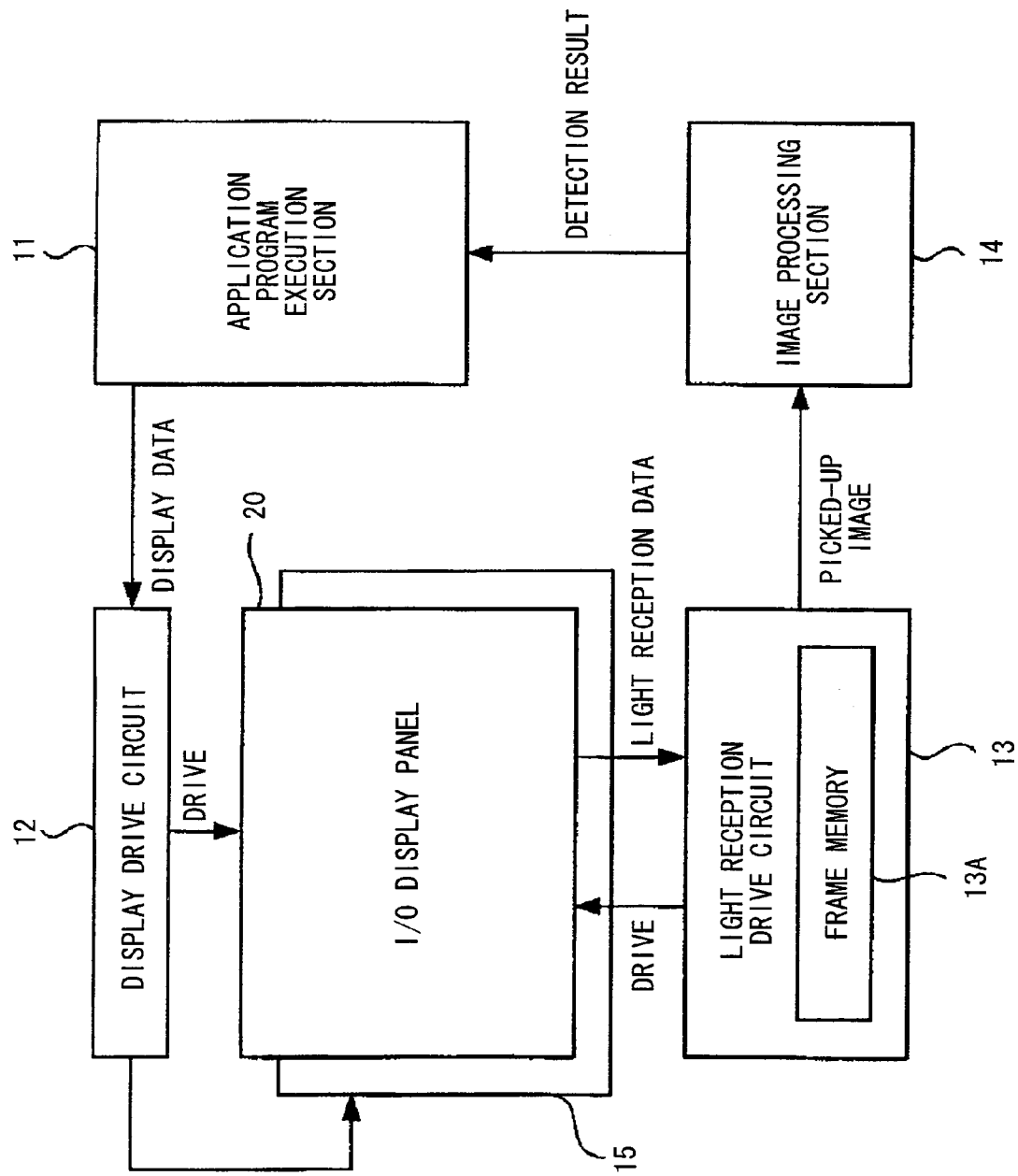
FIG. 1 is a block diagram showing a configuration of a display-and-image-pickup apparatus according to a first embodiment of the invention.

FIG. 1 shows the whole configuration of a display-and-image-pickup apparatus according to a first embodiment of the invention. The display-and-image-pickup apparatus includes an I/O display panel 20, a backlight 15, a display drive circuit 12, a light reception drive circuit 13, an image processing section 14 and an application program execution section 11.

The I/O display panel 20 is configured of a liquid crystal panel (LCD (Liquid Crystal Display)) in which a plurality of pixels are arranged in a matrix form on the whole surface thereof, and has a function (display function) of displaying an image such as a predetermined symbol or character on the basis of display data while performing a line-sequential operation, and a function (image pickup function) of picking up an image of an object touching or in proximity to the I/O display panel 20, as will be described later. Moreover, the backlight 15 is a light source of the I/O display panel 20, and is formed, for example, by arranging a plurality of light-emitting diodes, and as will be described later, the backlight 15 performs an on-off operation at high speed at a predetermined timing in synchronization with an operation timing of the I/O display panel 20.

The display drive circuit 12 is a circuit driving the I/O display panel 20 (driving a line-sequential operation) so as to display an image on the I/O display panel 20 on the basis of display data (to perform a display operation).

The light reception drive circuit 13 is a circuit driving the I/O display panel 20 (driving a line-sequential operation) so as to obtain light reception data in the I/O display panel 20 (to pick up an image of an object). Light reception data in each pixel is stored in a frame memory 13A, for example, on a frame-by-frame basis to be outputted to the image processing section 14 as a picked-up image. Moreover, the light reception drive circuit 13 controls an image pickup device (a light reception sensor 31c or the like which will be described later) so as to obtain an offset noise (an initialized image R) by an image pickup process in a state (a reset state) in which the image pickup device is initialized. A process of obtaining a reset image R and an offset noise will be described in detail later.

The image processing section 14 performs predetermined image processing (arithmetic processing) on the basis of the picked-up image outputted from the light reception drive circuit 13, and detects and obtains object information (position coordinate data, data about the shape or size of the object, or the like) which is information about the object touching or in proximity to the I/O display panel 20. A process of detecting will be described in detail later.

The application program execution section 11 executes a process according to predetermined application software on the basis of a detection result by the image processing section 14, and as the application program execution section 11, for example, a section in which the position coordinates of a detected object are included in display data, and are displayed on the I/O display panel 20, or the like is cited. Display data produced in the application program execution section 11 is supplied to the display drive circuit 12. In addition, an execution example of an application program by the application program execution section 11 will be described in detail later.

Figure 2:
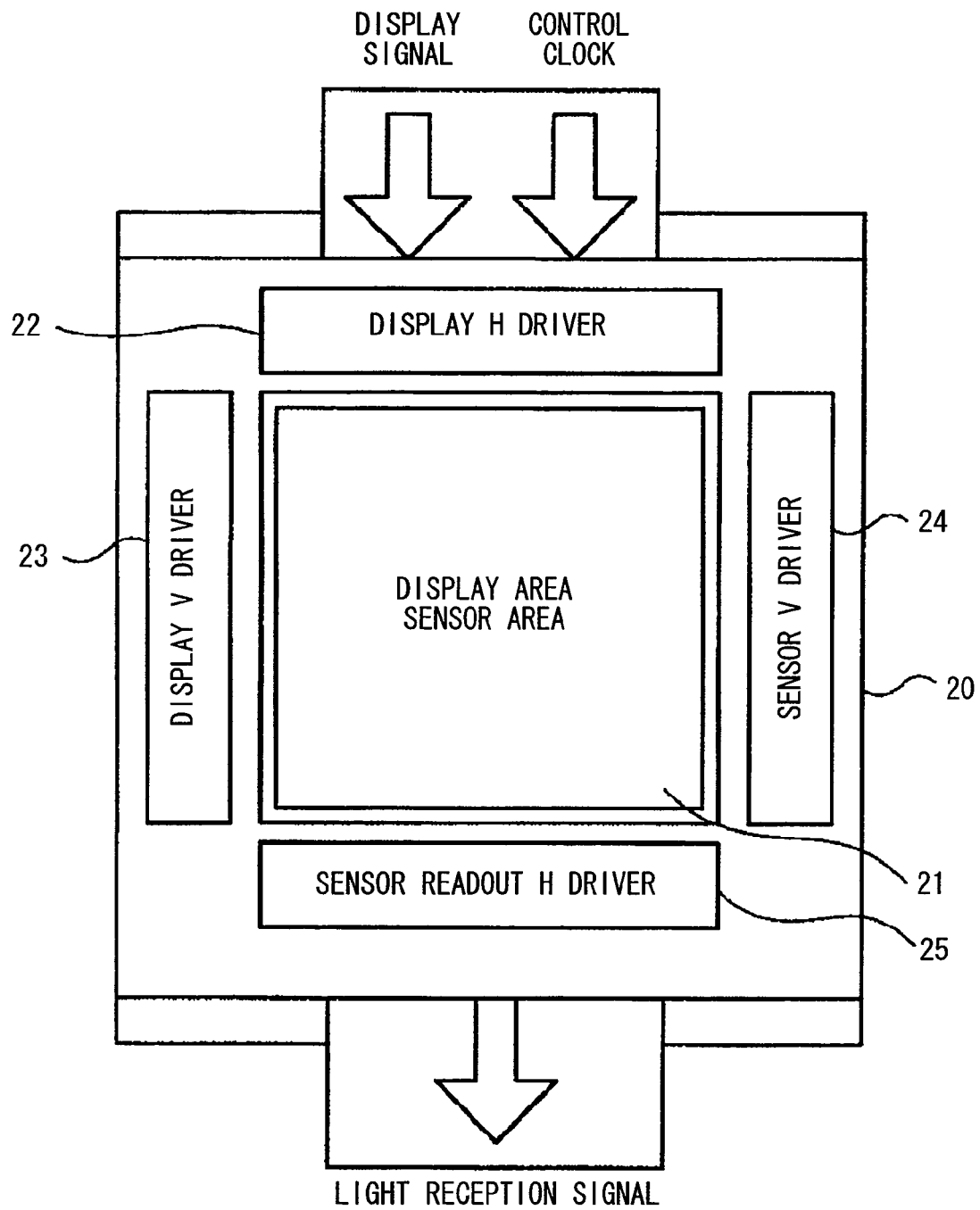
FIG. 2 is a block diagram showing a configuration example of an I/O display panel shown in FIG. 1.

Next, a specific configuration example of the I/O display panel 20 will be described below referring to FIG. 2. The I/O display panel 20 includes a display area (sensor area) 21, a display H driver 22, a display V driver 23, a sensor readout H driver 25 and a sensor V driver 24.

The display area (sensor area) 21 is an area in which light from the backlight 15 is modulated to be emitted as display light, and an image of an object touching or in proximity to the area is picked up, and in the display area 21, liquid crystal devices which are light-emitting devices (display devices) and light-receiving devices (image pickup devices) which will be described later are arranged in a matrix form. A plurality of display devices and a plurality of image pickup devices are formed on, for example, a substrate such as a silicon (Si) substrate or a non-silicon substrate. In addition, as the non-silicon substrate, for example, a glass substrate, a plastic substrate or the like is cited.

The display H driver 22, together with the display V driver 23, line-sequentially drives a liquid crystal device of each pixel in the display area 21 on the basis of a display signal for display drive and a control clock which are supplied from the display drive circuit 12.

The sensor readout H driver 25, together with the sensor V driver 24, line-sequentially drives a light-receiving device of each pixel in the display area 21 on the basis of a signal for light reception drive and a control clock which are supplied from the light reception drive circuit 13 to obtain a light reception signal (light reception data).

Figure 3:
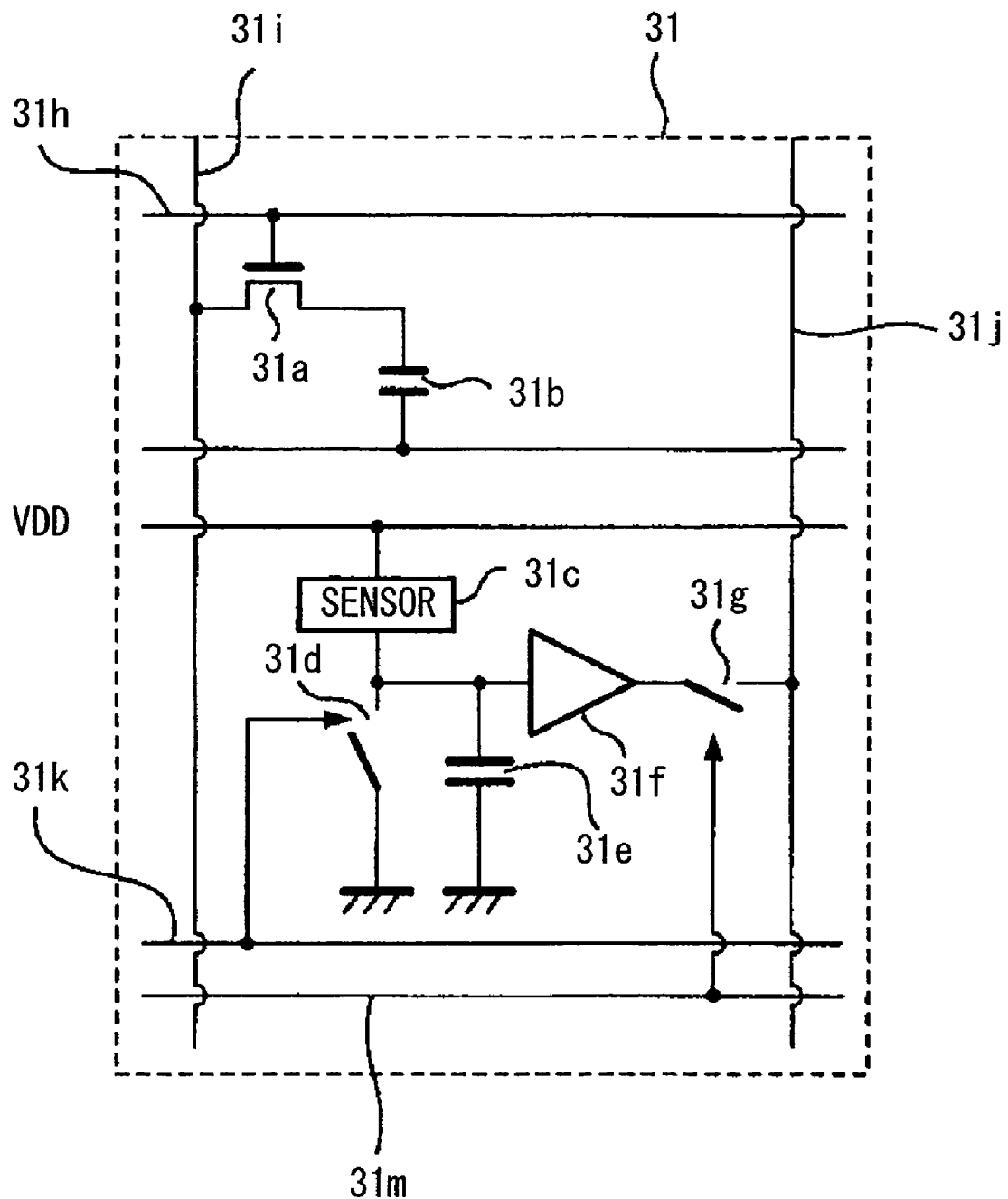
FIG. 3 is a circuit diagram showing a configuration example of each pixel.

Next, referring to FIG. 3, a specific configuration example of each pixel in the display area 21 will be described below. A pixel 31 shown in FIG. 3 includes a liquid crystal device which is a display device and a light-receiving device (an image pickup device).

More specifically, a switching device 31a configured of a thin film transistor (TFT) or the like is arranged at an intersection of a gate electrode 31h extending in a horizontal direction and a drain electrode 31i extending in a vertical direction on the display device side, and a pixel electrode 31b including a liquid crystal is arranged between the switching device 31a and a facing electrode. Then, the switching device 31a performs an on-off operation on the basis of a drive signal supplied through the gate electrode 31h, and in an on state, a pixel voltage is applied to the pixel electrode 31b on the basis of a display signal supplied through the drain electrode 31i to set a display state.

On the other hand, on the light-receiving device side adjacent to the display device, for example, a light reception sensor 31c configured of, for example, a photodiode or the like is arranged, and a power source voltage VDD is supplied to the light reception sensor 31c. Moreover, a reset switch 31d and a capacitor 31e are connected to the light reception sensor 31c, and after the reset switch 31d is turned into an on state, and an accumulated charge in the capacity 31e corresponding to a light reception amount in a previous image pickup process is reset (initialized, discharged), a charge corresponding to a light reception amount in a subsequent image pickup process is accumulated in the capacitor 31e. Then, the accumulated charge is supplied to a signal output electrode 31j through a buffer amplifier 31f at a timing when a readout switch 31g is turned into an on state, and then the accumulated charge is outputted to outside. Moreover, the on-off operation of the reset switch 31d is controlled by a signal supplied from a reset electrode 31k, and the on-off operation of the readout switch 31g is controlled by a signal supplied from a readout control electrode 31m.

Moreover, in the display-and-image-pickup apparatus according to the embodiment, even in a state where the reset switch 31d is turned on to reset the light reception sensor 31c, in a predetermined case, the readout switch 31g is controlled to be in an on state. When a picked-up image (the above-described reset image R) in such a reset state is obtained, an image pickup signal in a reset state, that is, an offset noise due to offset variations in the light reception sensor 31c and offset variations in the buffer amplifier 31f corresponding to its peripheral circuitry or the like is obtained as necessary.

Figure 4:
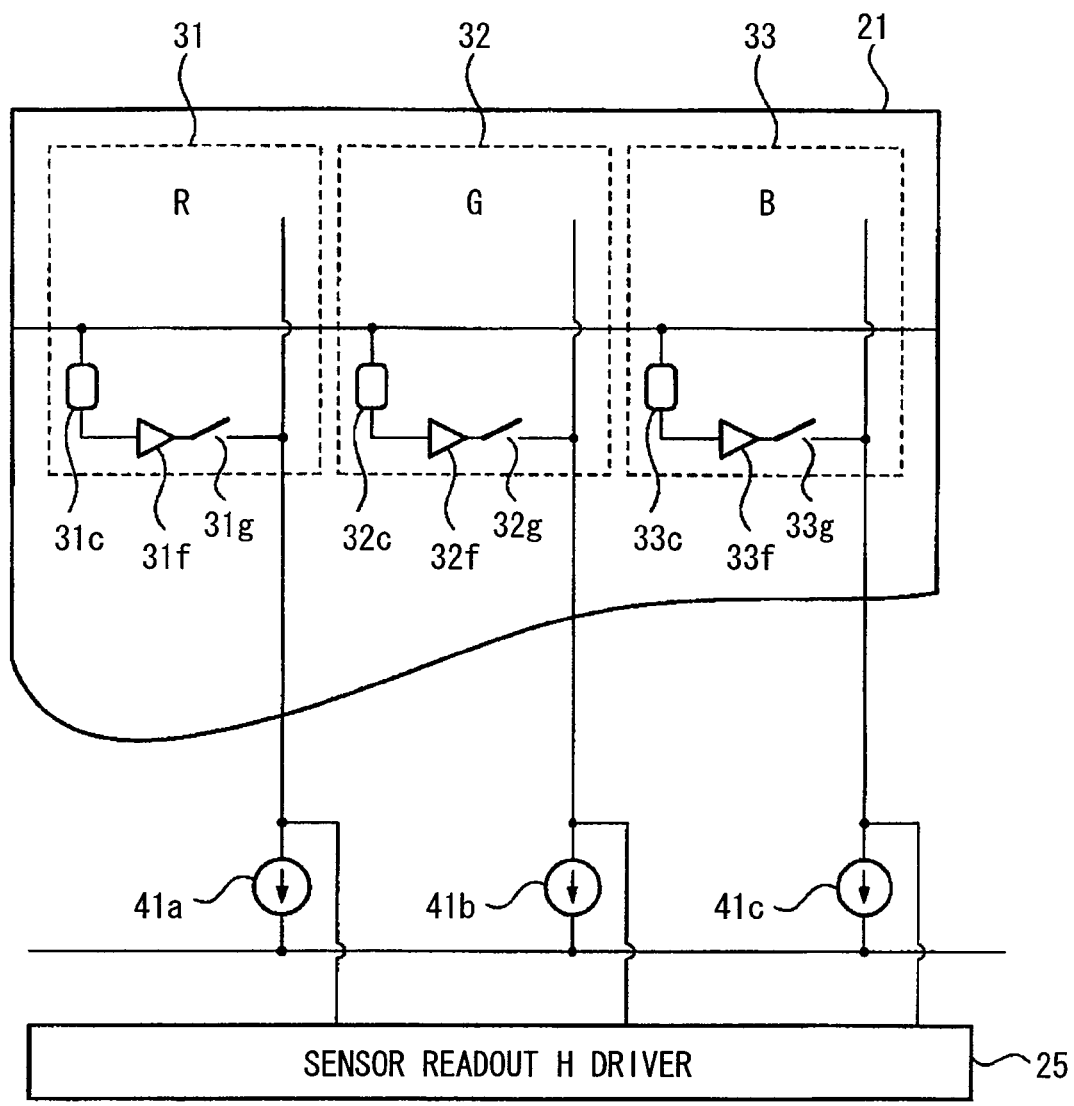
FIG. 4 is a circuit diagram for describing a connection relationship between each pixel and a sensor readout H driver.

Next, referring to FIG. 4, a connection relationship between each pixel in the display area 21 and the sensor readout H driver 25 will be described below. In the display area 21, a red (R) pixel 31, a green (G) pixel 32 and a blue (B) pixel 33 are arranged in order.

A charge accumulated in a capacitor connected to each of light reception sensors 31c, 32c and 33c of the pixels is amplified by each of buffer amplifiers 31f, 32f and 33f to be supplied to the sensor readout H driver 25 through each of signal output electrodes at timings when each of readout switches 31g, 32g or 33g is turned on. Moreover, each of constant current sources 41a, 41b and 41c is connected to each of the signal output electrodes so that a signal corresponding to a light reception amount is detected in the sensor readout H driver 25 with high sensitivity.

Herein, the I/O display panel 20 and the backlight 15 correspond to specific examples of "a display image pickup panel" and "an image pickup panel" in the invention. Moreover, the light reception drive circuit 13 corresponds to a specific example of "an image pickup control means" in the invention, the display drive circuit 12 corresponds to a specific example of "a display control means" in the invention, and the image processing section 14 corresponds to a specific example of "an image processing means" in the invention. Further, the light reception drive circuit 13 and the image processing section 14 correspond to specific examples of "an image pickup processing apparatus" in the invention.

Next, operations of the display-and-image-pickup apparatus according to the embodiment will be described in detail below.

At first, a basic operation of the display-and-image-pickup apparatus, that is, an operation of displaying an image and an operation of picking up an image of an object will be described below.

In the display-and-image-pickup apparatus, a display drive signal is produced in the display drive circuit 12 on the basis of display data supplied from the application program execution section 11, and line-sequential display drive is performed on the I/O display panel 20 by the drive signal to display an image. Moreover, at this time, the backlight 15 is also driven by the display drive circuit 12 to perform a lighting-on/off operation in synchronization with the I/O display panel 20.

Figure 5:
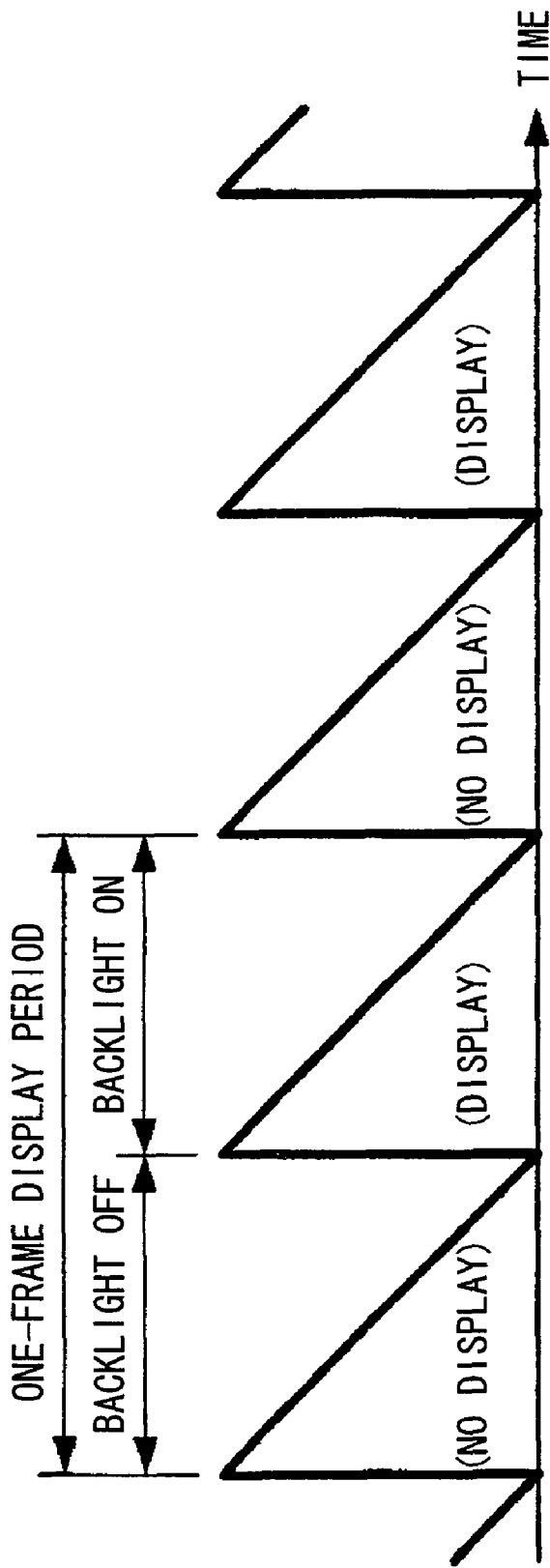
FIG. 5 is a timing chart for describing a relationship between an on-off state of a backlight and a display state.

Here, referring to FIG. 5, a relationship between the on-off state of the backlight 15 and the display state of the I/O display panel 20 will be described below.

At first, for example, in the case where an image is displayed in a frame period of 1/60 seconds, the backlight 15 is turned off (turned into an off state) in the first half of each frame period (during 1/120 seconds), and display is not performed. On the other hand, in the second half of each frame period, the backlight 15 is turned on (turned into an on state), and a display signal is supplied to each pixel to display an image in the frame period.

Thus, while the first half of each frame period (a unit operation cycle period) is a non-lighting period in which display light is not emitted from the I/O display panel 20, the second half of each frame period is a lighting period in which display light is emitted from the I/O display panel 20.

Here, in the case where there is an object (for example, a fingertip or the like) which touches or comes in proximity to the I/O display panel 20, an image of the object is picked up by the light-receiving device of each pixel in the I/O display panel 20 by line-sequential light reception drive by the light reception drive circuit 13, and a light reception signal from each light-receiving device is supplied to the light reception drive circuit 13. In the light reception drive circuit 13, the light reception signals of pixels in 1 frame are temporarily stored in the frame memory 13A. At this time, a noise process which removes an offset noise which will be described later is performed, and a picked-up image (a noise-processed image which will be described later) obtained after performing the noise process is outputted to the image processing section 14.

Then, in the image processing section 14, on the basis of the noise-processed image, predetermined image processing (arithmetic processing) which will be described later is performed, thereby object information (position coordinate data, data about the shape or size of the object or the like) as information about the object touching or in proximity to the I/O display panel 20 is detected and obtained.

Next, referring to FIGS. 6 to 22, a process (a fingertip extraction process) of extracting an object (a proximity object) which touches or comes in proximity to the I/O display panel 20 such as a fingertip by the image processing section 14 which is one of characteristic parts of the invention will be described in detail below. Here, FIG. 6 shows a flow chart of the fingertip extraction process by the image processing section 14, and FIG. 7 shows a timing chart of a part of the fingertip extraction process.

Figure 7:
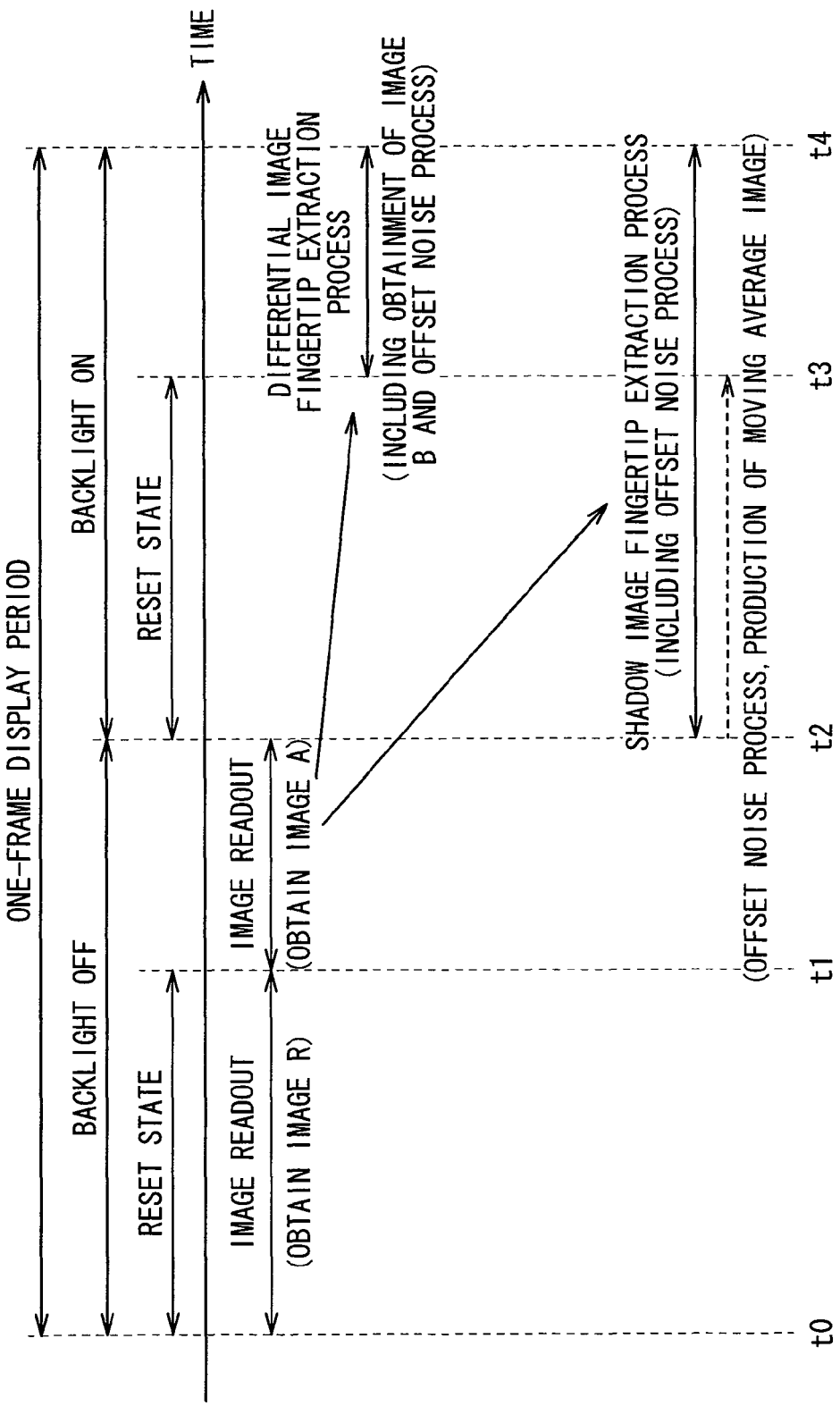
FIG. 7 is a timing chart for describing each extraction process shown in FIG. 6.

As can be seen from FIG. 7, a one-frame display period as a unit operation cycle period is broadly divided into the first half period (from a timing t0 to a timing t2: a non-lighting period) as a period in which the backlight 15 is off and the second half period (from the timing t2 to a timing t4: a lighting period) as a period in which the backlight 15 is on. Moreover, in each of the non-lighting period and the lighting period, before an image readout period (a period of obtaining an image pickup process), a period in which the image pickup device is in a reset state (from the timing t0 to a timing t1, from a timing t2 to the timing t3) is set, and a previous light reception signal (an image pickup signal) is reset (initialized).

Figure 6:
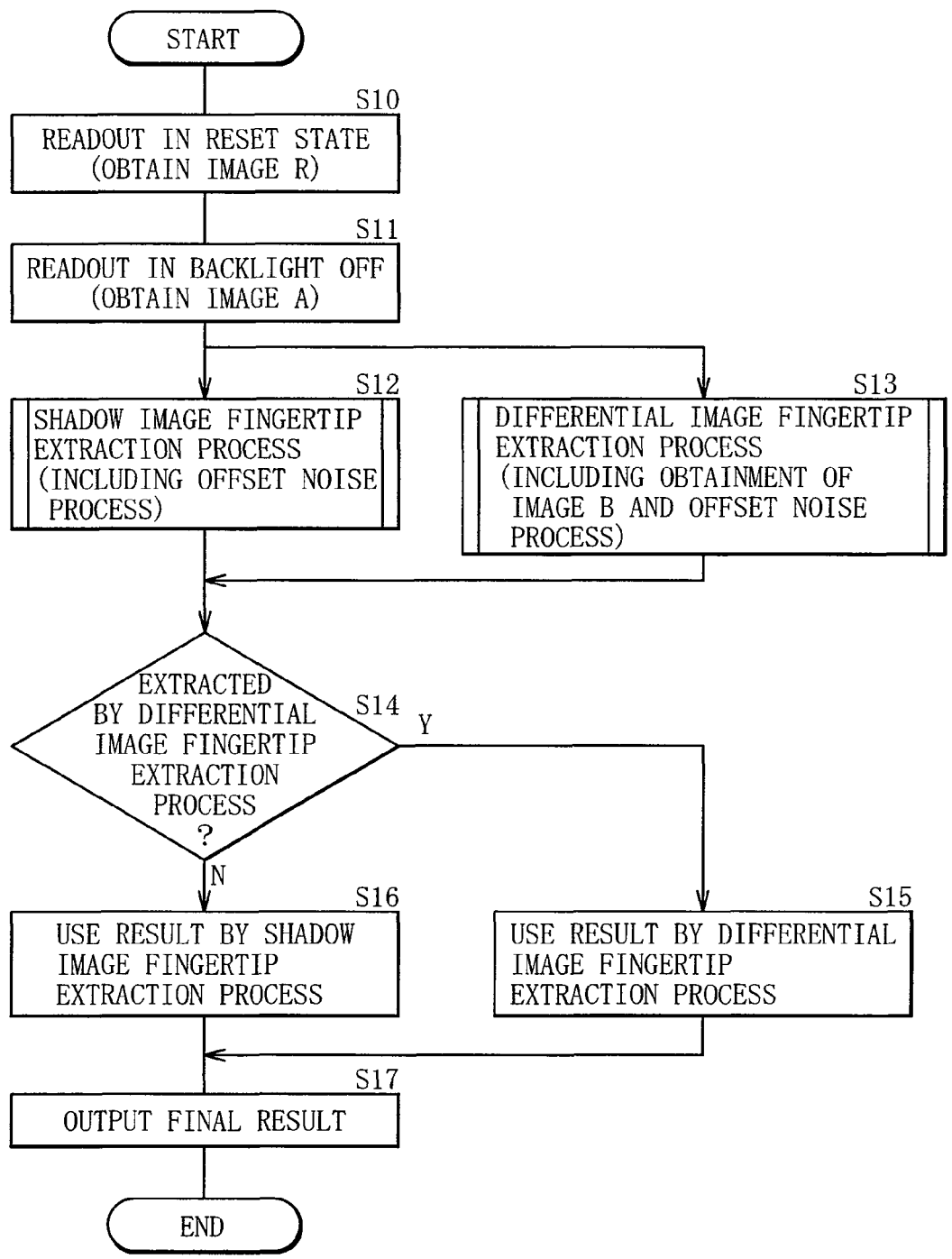
FIG. 6 is a flow chart showing a fingertip extraction process according to the first embodiment.

At first, in a period from the timing t0 to the timing t1 in the non-lighting period, an image pickup process in a reset state is performed by the I/O display panel 20 to obtain an image R (a reset image) (step S10 in FIG. 6). Thereby, an image pickup signal in a reset state, that is, an offset noise is obtained.

Next, in a period from the timing t1 to the timing t2 in the non-lighting period, an image of a shadow of the proximity object is picked up by the I/O display panel 20, thereby an image A (a shadow image) is obtained (step S11). Then, in a period from the timing t2 to the timing t4 (the lighting period) after that, on the basis of the obtained image A (the shadow image), the fingertip extraction process (a shadow image fingertip extraction process) including an offset noise process which will be described later is performed by the light reception drive circuit 13 and the image processing section 14 (step S12).

On the other hand, in parallel with the shadow image fingertip extraction process, in a period from the timing t2 to the timing t3 in the lighting period, at first, the image pickup device is turned into a reset state, and an image pickup signal of the image A is reset. Moreover, in a reset state in the lighting period, the image pickup process is not performed, and a reset image is not obtained. It is because even if an offset noise is obtained by obtaining a reset image in this period, the offset noise is rarely different from an offset noise obtained in the non-lighting period, and is considered as substantially the same offset noise.

Moreover, in parallel with the shadow image fingertip extraction process, next, in a period from the timing t3 to the timing t4 in the lighting period, a process of picking up an image of the proximity object is performed by the I/O display panel 20 to obtain an image B (an illumination light (display light)-using image). Then, the fingertip extraction process (a differential image fingertip extraction process on the basis of a differential image C which will be described later) including the obtainment of the image B and an offset noise process which will be described later is performed by the light reception drive circuit 13 and the image processing section 14 (step S13).

Next, the image processing section 14 determines whether a fingertip was extracted by the differential image fingertip extraction process in the step S12 (whether objection information such as the position, shape, size or the like of the proximity object such as a fingertip was obtained) (step S14). In the case where the image processing section 14 determines that the fingertip was extracted (step S14: Y), the image processing section 14 determines to use an extraction result by the differential image fingertip extraction process (step S15), and a final result is outputted to the application program execution section 11 (step S17). On the other hand, in the case where the image processing section 14 determines that the fingertip was not extracted (step S14: N), the image processing section 14 determines to use an extraction result by the shadow image fingertip extraction process (step S16), and a final result is outputted to the application program execution section 11 (step S17).

Thus, in consideration of both of the differential image fingertip extraction process as a main process and the shadow image fingertip extraction process as a sub process, an extraction result by one of the extraction processes is finally selected.

Next, the shadow image fingertip extraction process and the differential image fingertip extraction process will be described in detail below.

Figure 8:
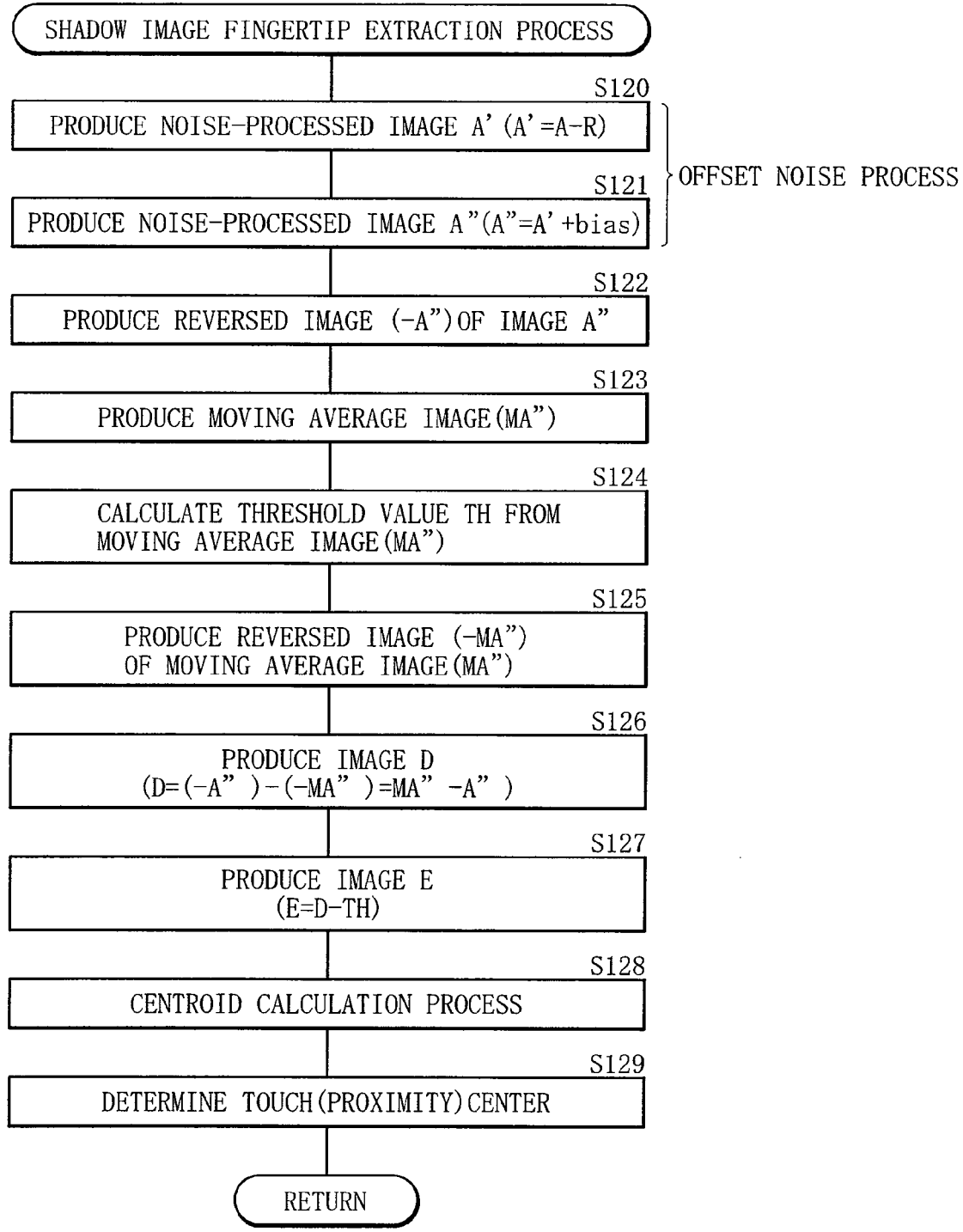
FIG. 8 is a flow chart showing details of a shadow image fingertip detection process shown in FIG. 7.
Figure 9:
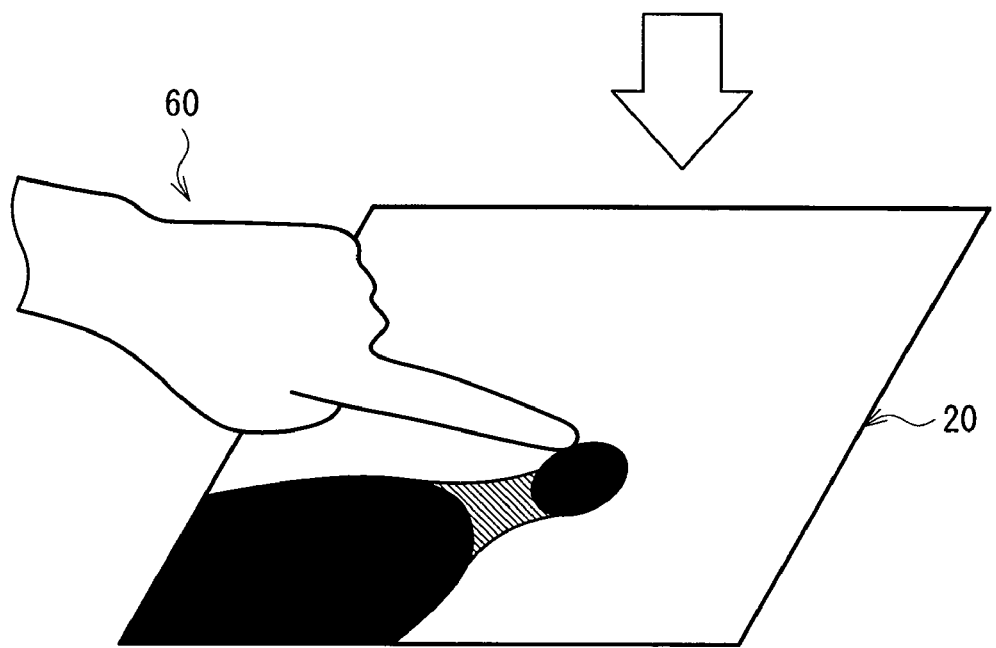
FIG. 9 is a perspective view for describing a concept of the shadow image fingertip detection process.
Figure 10:
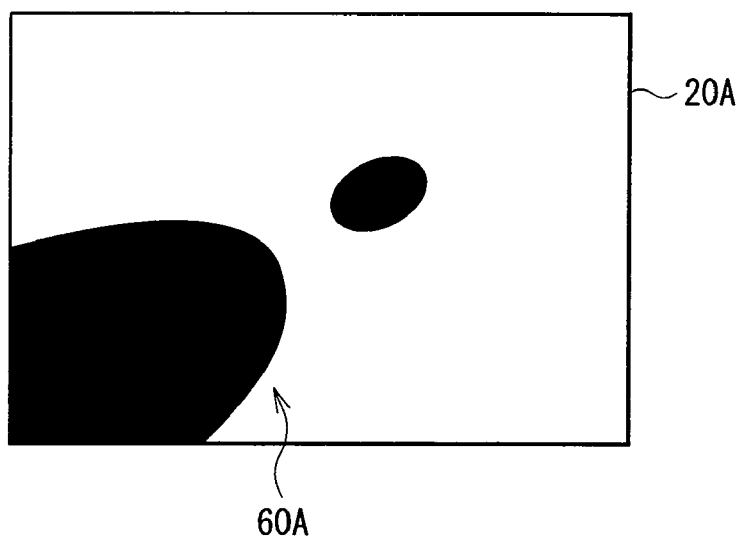
FIG. 10 is a schematic view showing an example of a picked-up image by the shadow image fingertip detection process.
Figure 12:
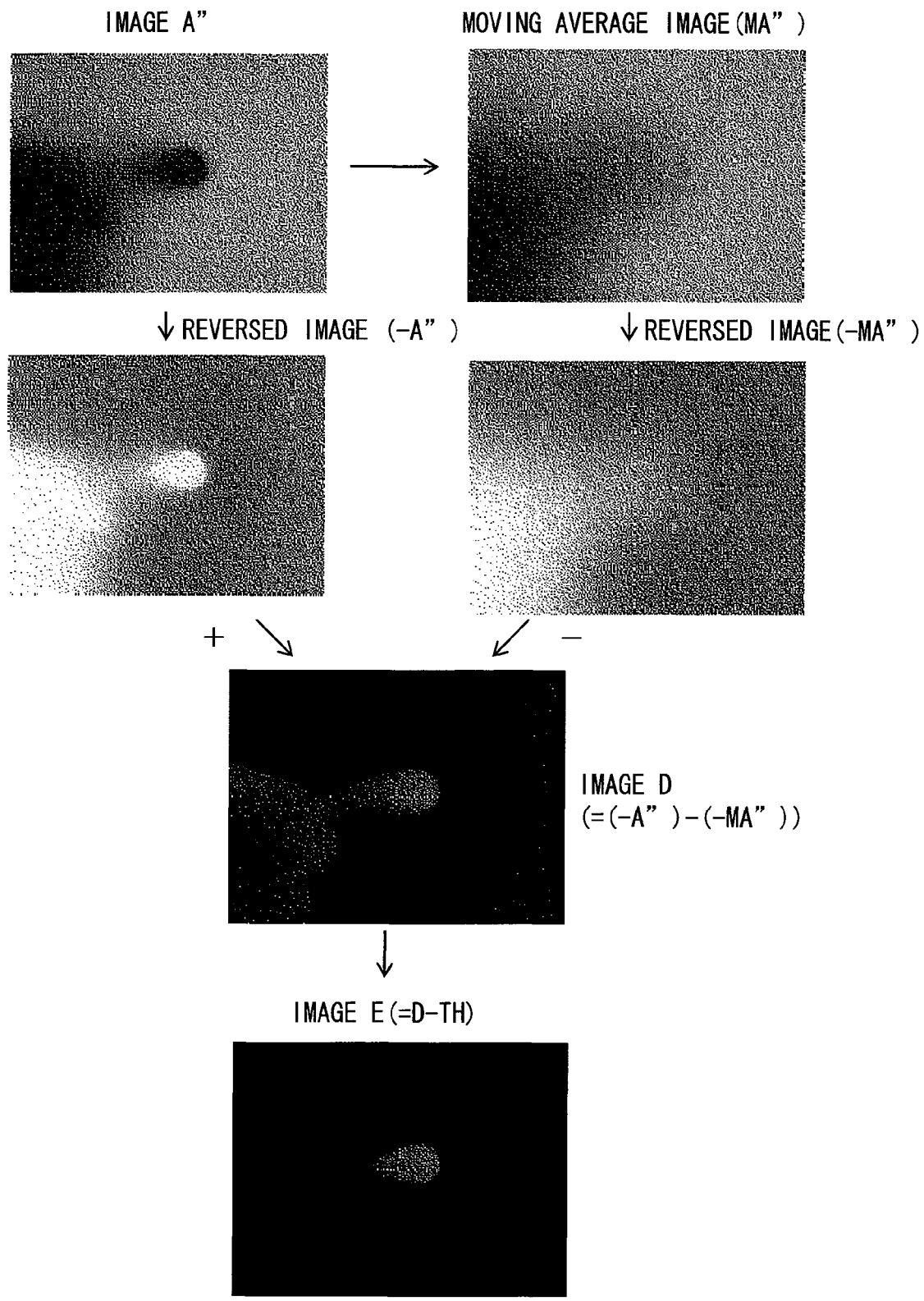
FIG. 12 is a photographic view for describing the shadow image fingertip extraction process following FIG. 11.
Figure 13:
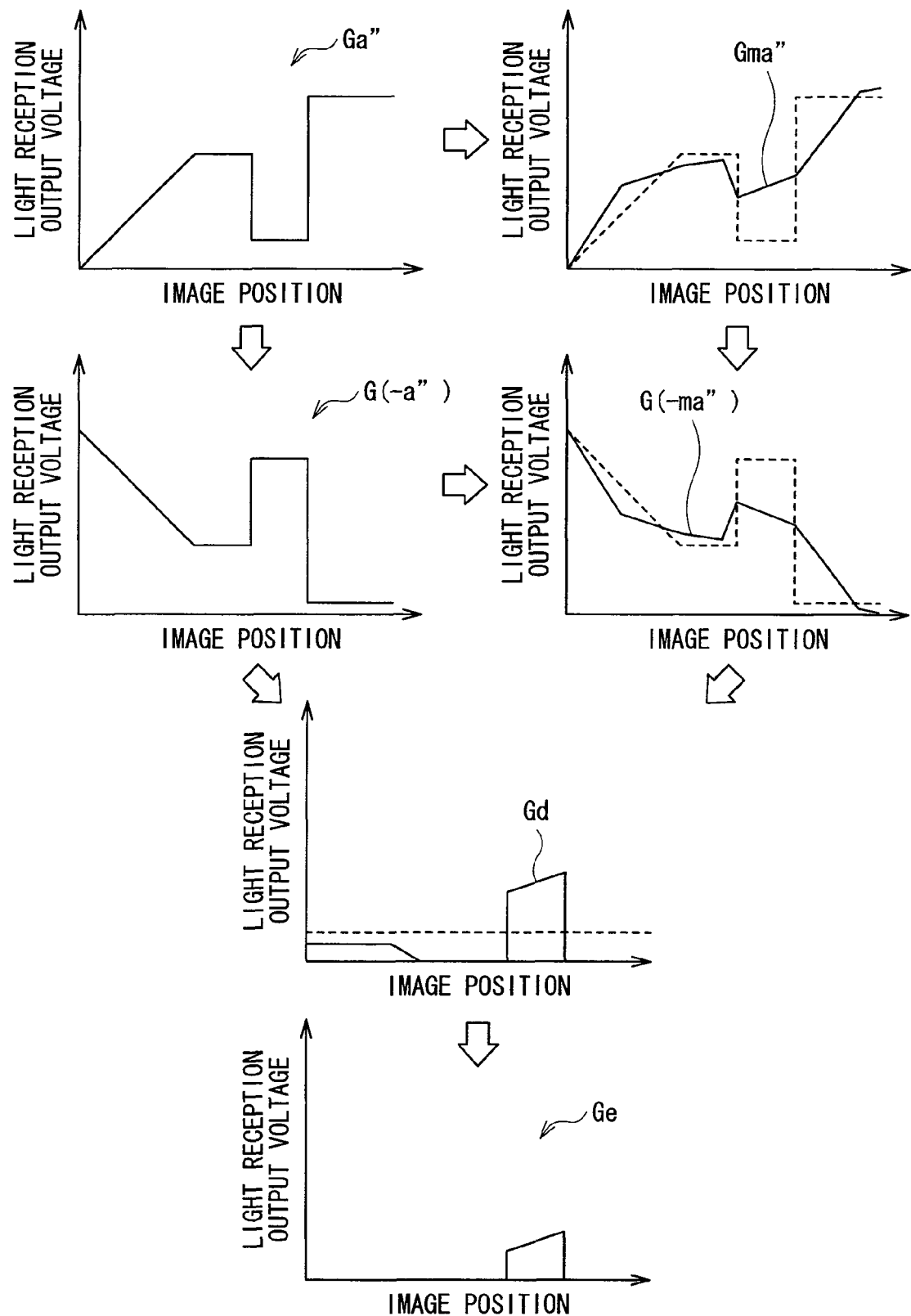
FIG. 13 is an illustration for describing a light reception signal by the shadow image fingertip extraction process.

At first, referring to FIGS. 8 to 16, the shadow image fingertip extraction process will be described in detail below. Here, FIG. 8 shows a flow chart of details of the shadow image fingertip extraction process, and FIG. 9 shows a perspective view of a state in the shadow image fingertip extraction process, and FIG. 10 schematically shows an example of a picked-up image by the shadow image fingertip detection process. Moreover, FIG. 11 shows a photograph of an example of images (the image R, the image A, an image A' and an image A") in the offset noise process of the shadow image fingertip extraction process which will be described later, and FIG. 12 shows a photograph of an example of images (the image A", an image (−A") an image (MA"), an image (−MA"), an image D and an image E which will be described later) after the offset noise process of the shadow image fingertip extraction process, and FIG. 13 shows a plot of an image position and a light reception output voltage in a part of an image example shown in FIG. 12.

Figure 11:
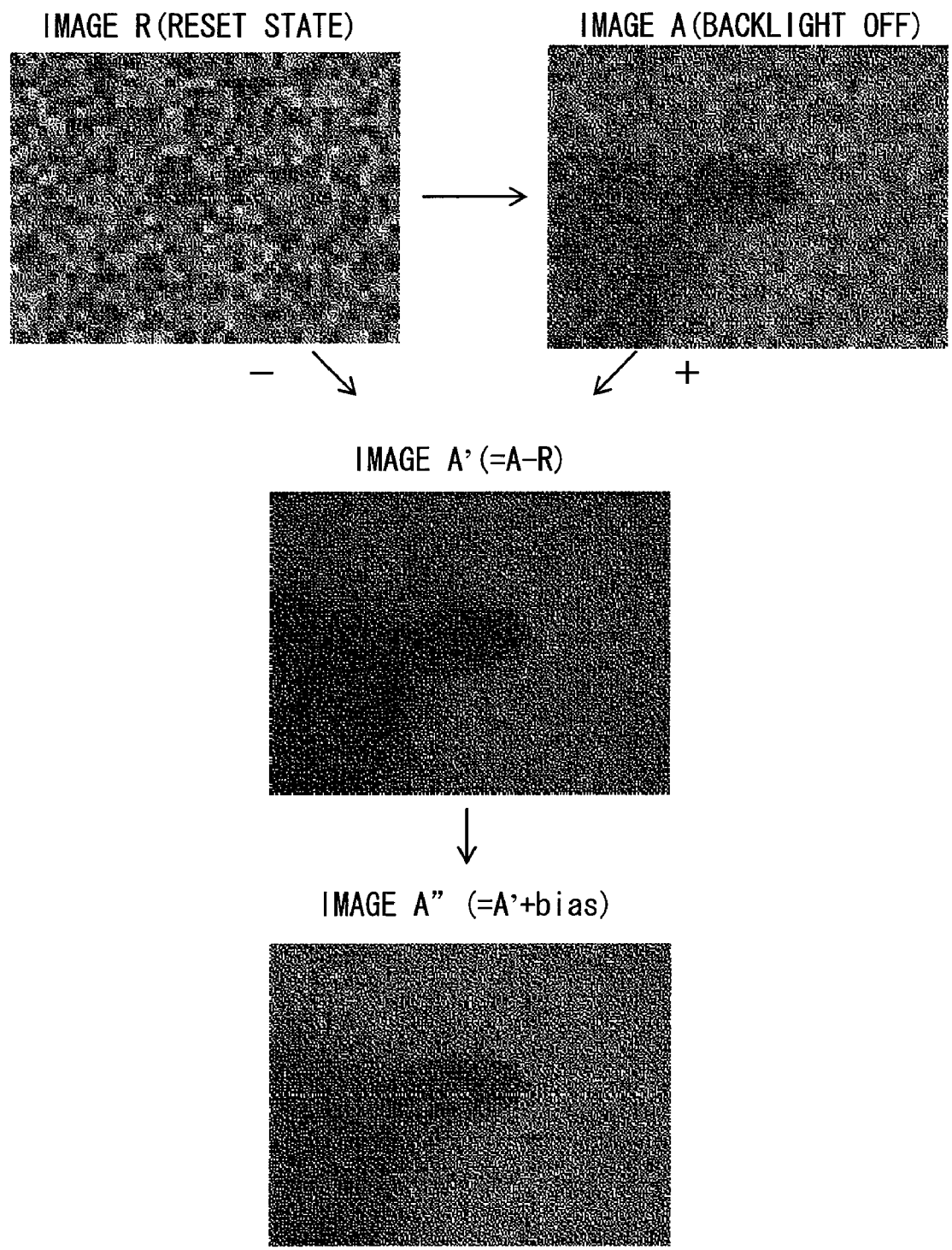
FIG. 11 is a photographic view for describing a shadow image fingertip extraction process.

At first, in the offset noise process (steps S120 and S121 in FIG. 8, refer to FIG. 11), the light reception drive circuit 13 produces the image A'=A−R as a differential image between the image A and the image R on the basis of the image A (the shadow image) and the image R (the reset image) which are already obtained (step S120, refer to FIG. 11). In other words, the noise-processed image A' is produced by removing the reset image R corresponding to an offset noise from the shadow image A. Next, the light reception drive circuit 13 produces the noise-processed image A"=A'+bias by adding a predetermined bias value (bias) to the noise-processed image A' (step S121, refer to FIG. 11). After the produced noise-processed image A" is temporarily stored in the frame memory 13A, the noise-processed image A" is outputted to the image processing section 14 as a picked-up image. Thereby, the offset noise process in which the predetermined bias value bias is added is completed. Moreover, the reason for adding the bias value bias will be described later.

Next, an original shadow image fingertip extraction process (steps S122 to S129, refer to FIG. 12) after the offset noise process is performed. At first, the image processing section 14 produces a reversed image (−A") of the noise-processed image A" obtained from the light reception drive circuit 13 (step S122, refer to FIG. 12). Moreover, the image processing section 14 produces a moving average image (MA") of the original image A" (step S123, refer to FIG. 12).

Figure 14A:
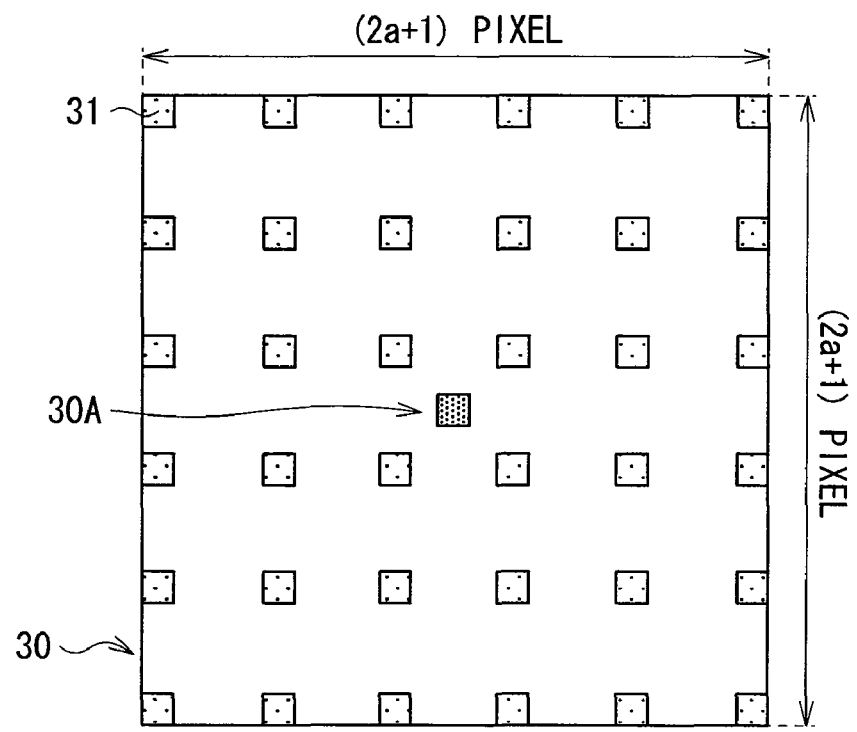
FIG. 14 is an illustration for describing a moving average image producing process.
Figure 14B:
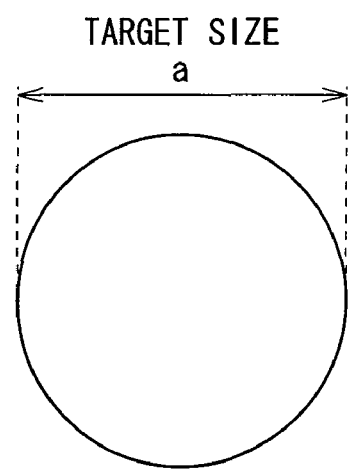
Figure 15:
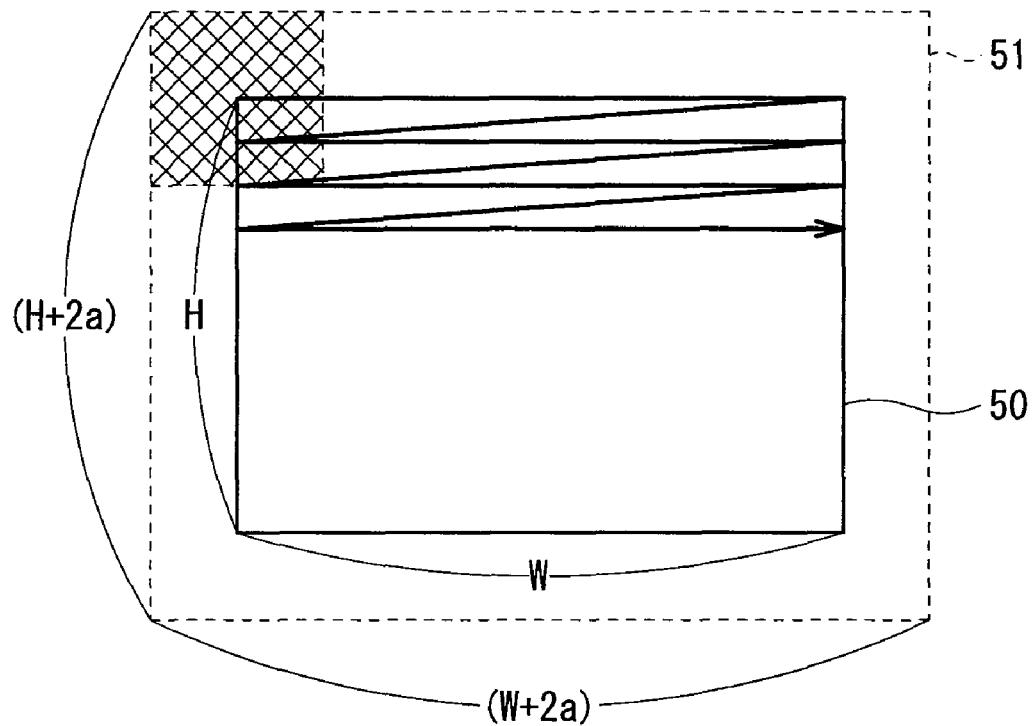
FIG. 15 is an illustration for describing the moving average image producing process.
Figure 16:
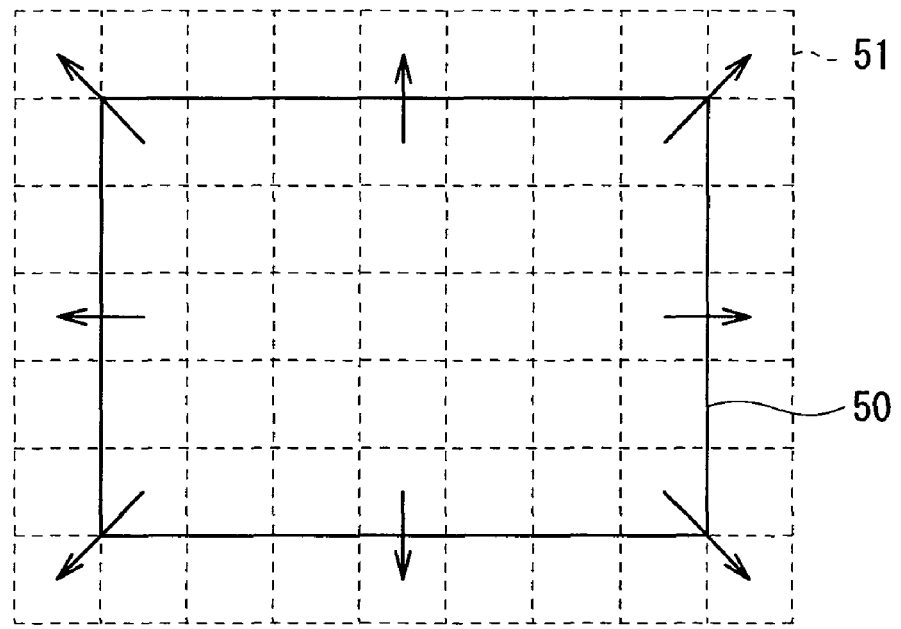
FIG. 16 is an illustration for describing the moving average image producing process.

To produce the moving average image (MA"), more specifically, for example, referring FIGS. 14(A) and (B), in the noise-processed image A", averaging arithmetic processing of pixel data is performed in a pixel region 30 including one marked pixel 30A and its peripheral pixels (in this case a pixel region of (2a+1) pixels×(2a+1) pixels), and, for example, as shown in FIG. 15, while an arithmetic result is reflected in averaging arithmetic processing in a pixel region including the next marked pixel, a marked pixel is sequentially moved to perform averaging arithmetic processing on the whole picked-up image. Moreover, it is desirable that the size of a pixel region 50 in the averaging arithmetic processing (in this case, (2a+1) pixels×(2a+1) pixels) is set on the basis of an expected size as an object to be detected (a target size a) (for example, the size of the pixel region 50 is set to be equivalent to the target size a). Although the detail will be described later, it is because when the pixel region 50 has such a size, for example, unlike an image 20A (corresponding to an image D or an image E which will be described later) shown in FIG. 10, a fist portion (a portion indicated by a reference numeral 60A) is prevented from being detected in addition to the fingertip as a proximity object. Further, for example, as shown in FIG. 16, for example, pixel data of a peripheral portion of the pixel region 50 may be copied as it is, and may be used as pixel data of a region 51 around the actual pixel region 50 which is necessary in the averaging arithmetic processing.

Next, the image processing section 14 determines a predetermined threshold value TH which is used later (in step S127) from the moving average image (MA") by calculation (step S124). More specifically, the threshold value TH is determined on the basis of pixel data of the brightest pixel (having the largest pixel data) in the moving average image (MA") and pixel data of the darkest pixel (having the smallest pixel data) in the original image A" (for example, by calculating the average of these pixel data). Moreover, assuming that proximity objects are not placed in the four corners of the display area 21 at the same time in general, the average value of the pixel data of pixels in the four corners may be allocated as the pixel data of the brightest pixel (having the largest pixel data).

Next, the image processing section 14 produces a reversed image (−MA") of the produced moving average image (MA") (step S125, refer to FIG. 12), and produces a differential image between the reversed image (−A") of the original image A" and the reversed image (−MA") of the moving average image (MA"), that is, a differential image D=(−A")−(−MA")=(MA")−A" between the moving average image (MA") and the original image (A") (step S126, refer to FIG. 12). Then, the image processing section 14 produces an image E=D−TH by subtracting the threshold value TH calculated in step S124 from each pixel data of the image D (step S125, refer to FIG. 12).

Here, as shown by the images D and E shown in FIG. 12 and light reception output voltage waveform examples Gd and Ge in the images D and E shown in FIG. 13, while only a fingertip portion with a size equivalent to the target size a is detected, a fist portion which is larger than the fingertip is not detected. Moreover, the light reception output voltage waveform examples Ga, G(−a), Gma and G(−ma) shown in FIG. 13 correspond to light reception output voltage waveform examples in the original image A, the reversed image (−A) of the original image A, the moving average image MA and the reversed image (−MA) of the moving average image MA, respectively.

Next, the image processing section 14 performs a centroid calculation process (step S128) and a touch (proximity) center determination process (step S129) which determine a touch (proximity) center on the produced image E. Thereby, object information such as the position, the shape, the size or the like of the object is obtained, and then the shadow image fingertip extraction process is completed.

Thus, in the shadow image fingertip extraction process, at first, the reset image R obtained by picking up an image in a state in which the image pickup device is reset is subtracted from the shadow image A obtained by picking up an image of a shadow of the object through the use of external light to remove an offset noise from the shadow image, thereby noise-processed images A' and A" are produced.

Moreover, the fingertip extraction process is performed on the basis of the differential image D between the moving average image MA" of the noise-processed image A" produced by performing the offset noise process and the original noise-processed image A", so the fingertip extraction process in consideration of the offset noise is performed, and in the case where as described above, only the object with a size equivalent to the target size is detected, thereby display light is not emitted (for example, in the case where the backlight 15 is constantly off such as the case where a liquid crystal device as a display device is a semitransparent liquid crystal device, and is used in the open air, the case where a black image is displayed on the I/O display panel 20 or the like), the object information about the proximity object is detected and obtained.

Further, in the shadow image fingertip extraction process, object information about a plurality of touching or proximity objects which are placed on the display area 21 of the I/O display panel 20 at the same time such as the position, the shape, the size or the like of each of the objects can be obtained.

Next, referring to FIGS. 17 to 21, the differential image fingertip extraction process will be described in detail below. Here, FIG. 17 shows a flow chart of details of the differential image fingertip extraction process, and FIG. 18 shows a photograph of an example of images (the image R, the image B, an image B' which will be described later, the image A", the image B" and the image C) in the differential image fingertip extraction process.

Figure 17:
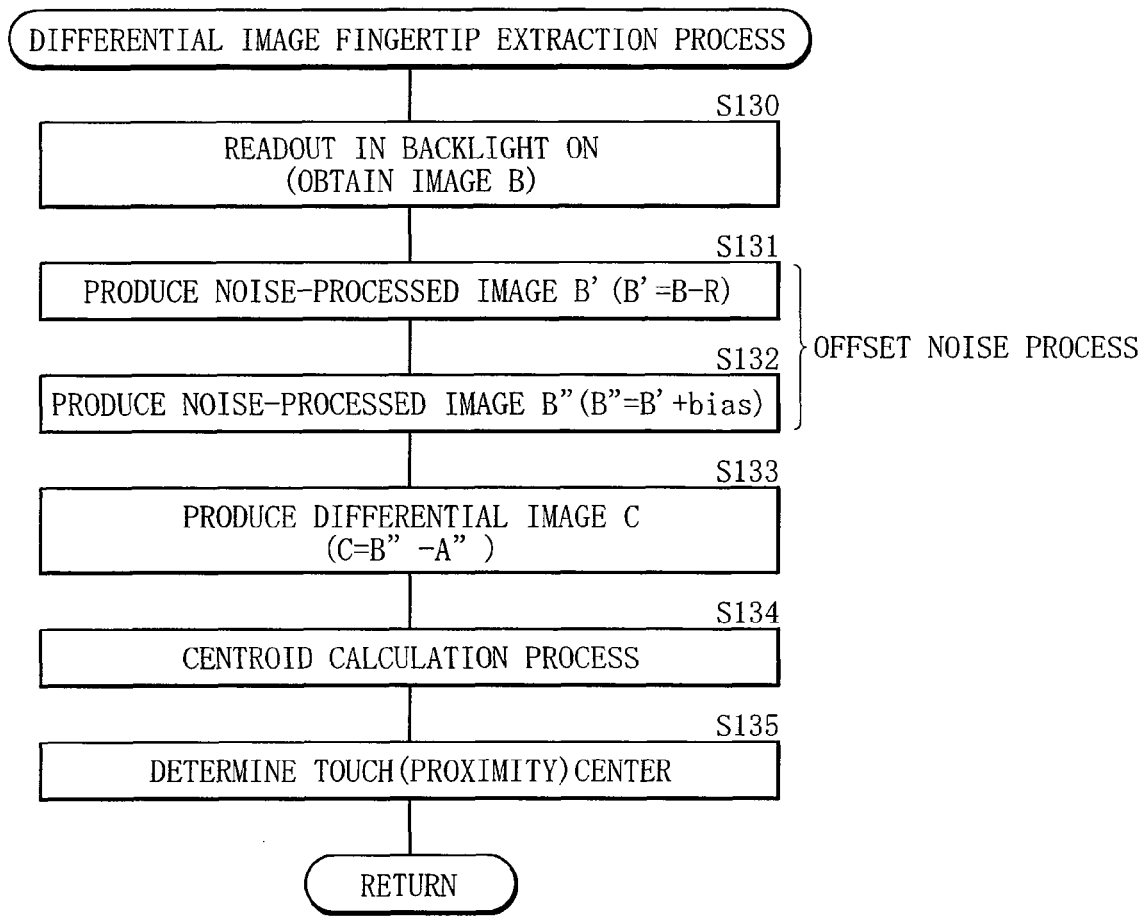
FIG. 17 is a flow chart showing details of a differential image fingertip extraction process shown in FIG. 7.
Figure 18:
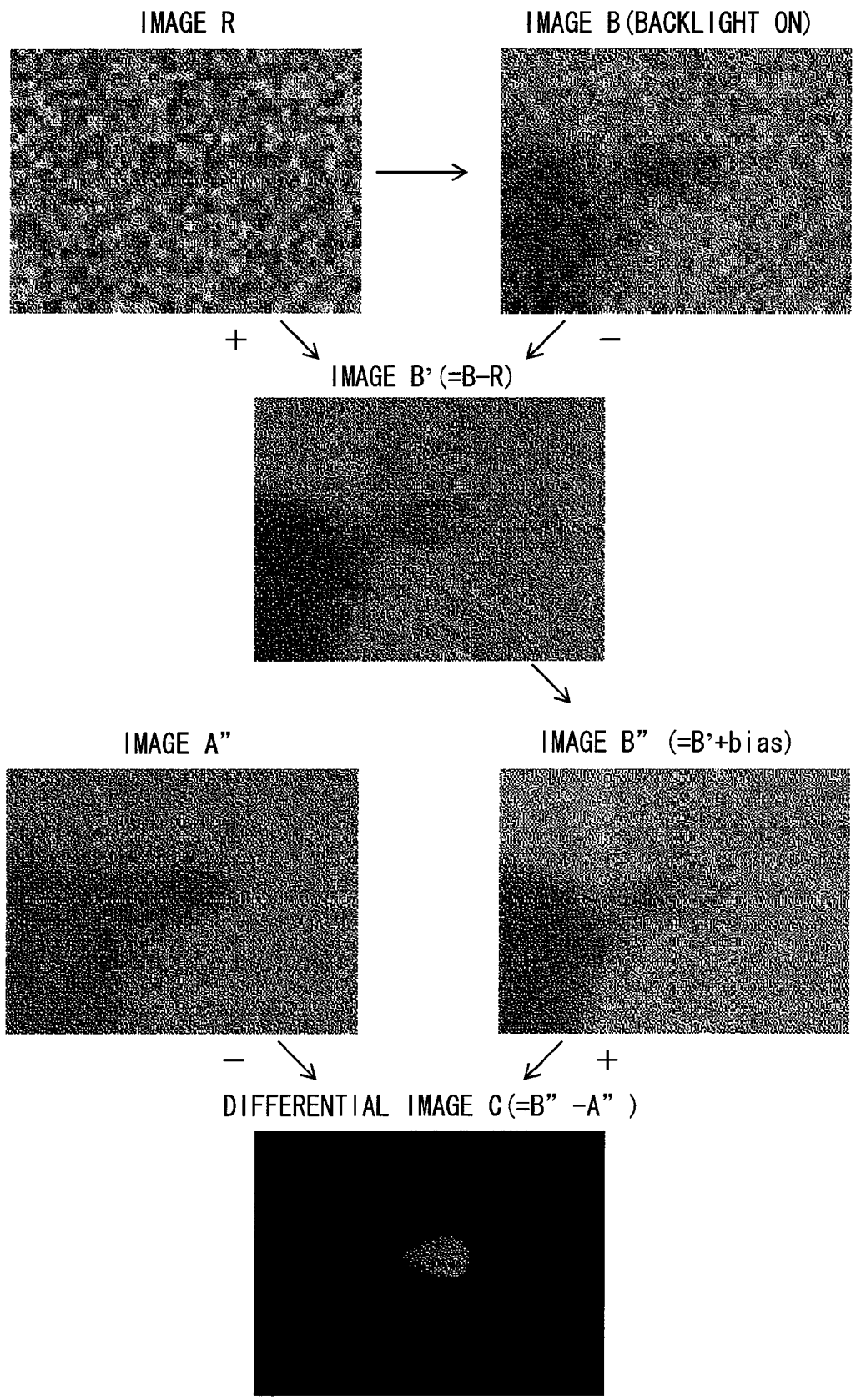
FIG. 18 is a photographic view for describing the differential image fingertip extraction process.

At first, as described above, in a period from the timing t3 to the timing t4 in the lighting period as a period in which the backlight is on, a process of picking up an image of the proximity object is performed by the I/O display panel 20 to obtain the image B (an illumination light (display light)-using image) (step S130 in FIG. 17, refer to FIG. 18).

Next, in the offset noise process (steps S131 and S132 in FIG. 17, refer to FIG. 18), the light reception drive circuit 13 produces an image B'=B−R as a differential image between the image B and the image R on the basis of the image B (display light-using image) and the image R (the reset image) which are already obtained (step S131, refer to FIG. 18). In other words, the noise-processed image B' is produced by removing the reset image R corresponding to the offset noise from the display light-using image B. Next, the light reception drive circuit 13 produces a noise-processed image B"=B'+bias by adding a predetermined bias value (bias) to the noise-processed image B' (step S132, refer to FIG. 18). After the produced noise-processed image B" is temporarily stored in the frame memory 13A, the noise-processed image B" is outputted to the image processing section 14 as a picked-up image. Thereby, the offset noise process in which the predetermined bias value bias is added is completed. Moreover, the reason for adding the bias value bias will be described later.

Next, an original differential image fingertip extraction process (steps S133 to S135, refer to FIG. 18) after the offset noise process is performed. At first, the image processing section 14 produces a differential image C=B"−A" between the produced noise-processed image B" and the noise-processed image A" which is already produced in step S121 in the shadow image fingertip extraction process (step S133, refer to FIG. 18).

Then, the image processing section 14 performs arithmetic processing of determining the centroid of the produced differential image C (step S134) to determine the touch (proximity) center (step S135).

Thus, in the differential image fingertip extraction process, the fingertip extraction process is performed on the basis of the differential image C between the noise-processed image B" which is obtained by removing the offset noise from the image B produced through the use of display light and the noise-processed image A" which is obtained by removing the offset noise from the image A produced through the use of not display light but external light. Therefore, also in the differential image C, the offset noise is removed. Moreover, by the fingertip extraction process on the basis of such a differential image C, the influence of the brightness of external light is removed as shown in a photographic image example of the differential image C shown in FIG. 18, and the proximity object is detected without the influence of the brightness of the external light.

More specifically, for example, as shown in a sectional view in FIG. 19(A), in the case where incident external light is strong, a light reception output voltage Von1 in a state in which the backlight 15 is on has a voltage value Va corresponding to the brightness of the external light at a point except for a point where a finger touches as shown in FIG. 19(B), and at the point where the finger touches, the light reception output voltage Von1 is reduced to a voltage value Vb corresponding to reflectivity at which light from the backlight is reflected on a surface of an object (the finger) touching at this time. On the other hand, a light reception output voltage Voff1 in a state in which the backlight 15 is off has the voltage value Va corresponding to the brightness of external light at a point except for a point where the finger touches as in the case of the state in which the backlight 15 is on; however, the point where the finger touches is in a state in which the external light is blocked, and the light reception output voltage Voff1 has a voltage value Vc which is at a very low level at the point.

Moreover, as shown in a sectional view in FIG. 20(A), in a state in which incident external light is weak (very little), as shown in FIG. 20(B), a light reception output voltage Von2 in a state in which the backlight 15 is on has a voltage value Vc which is at a very low level at a point except for the point where the finger touches, because there is no external light, and at the point where the finger touches, the light reception output voltage Von2 is increased to a voltage value Vb corresponding to reflectivity at which light from the backlight is reflected by a surface of the object (the finger) which touches the point at this time. On the other hand, a light reception output voltage Voff2 in a state in which the backlight 15 is off remains at a voltage value Vc which is at a very low level and is not changed at both of the point where the finger touches and other points.

Figure 19:
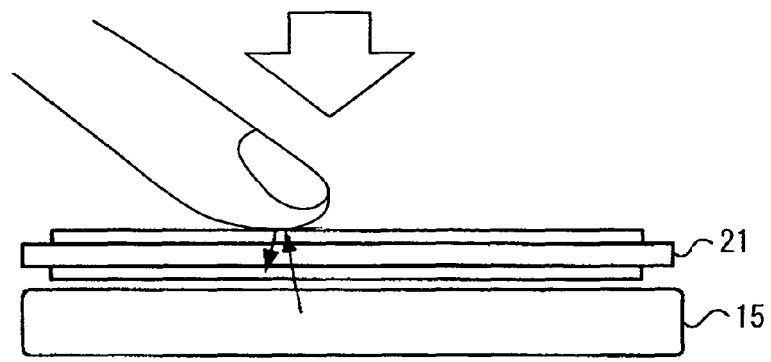
FIG. 19 is an illustration for describing the differential image fingertip extraction process in the case where external light is bright.
Figure 19:
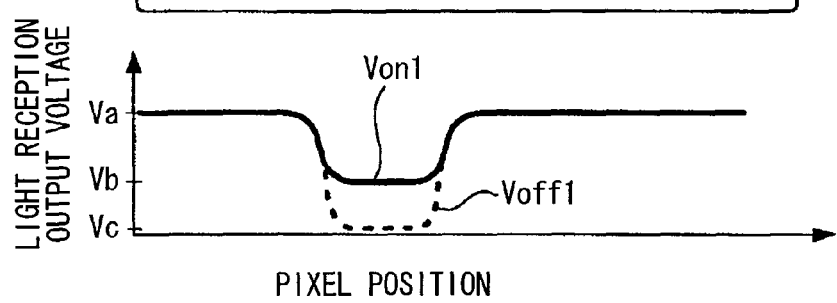
Figure 20:
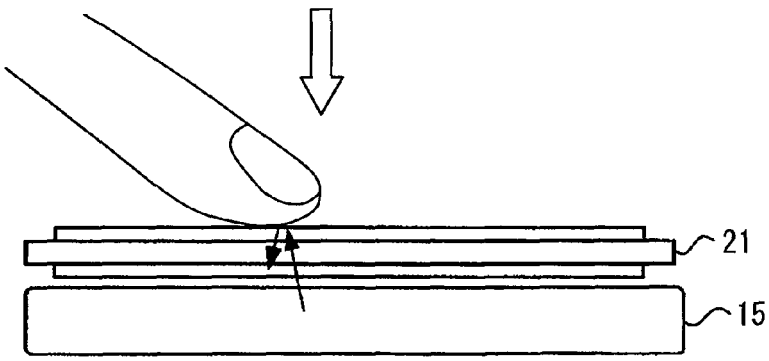
FIG. 20 is an illustration for describing the differential image fingertip extraction process in the case where external light is dark.
Figure 20:
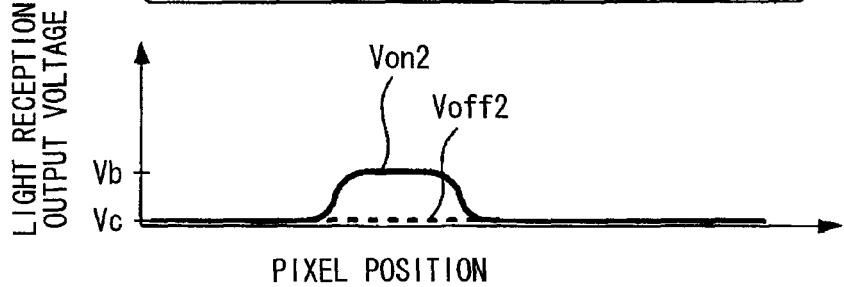

Thus, as can be seen from a comparison between FIGS. 19 and 20, at a point where the object does not touch the display area 21 of a panel, the light reception output voltage is largely different between the case where external light is present and the case where the external light is not present. However, at a point where the finger touches, irrespective of the presence or absence of the external light, the voltage Vb when the backlight is on and the voltage Vc when the backlight is off are substantially in the same state. Therefore, when a difference between the voltage when the backlight 15 is on and the voltage when the backlight 15 is off is detected, a point where there is a certain or larger difference between the voltages like a difference between the voltage Vb and the voltage Vc can be determined as a point where the finger touches or comes in proximity, and even in the case where the external light entering into the panel is strong, or in the case where there is little external light, touching or coming in proximity is detected well under uniform conditions.

Figure 21A:
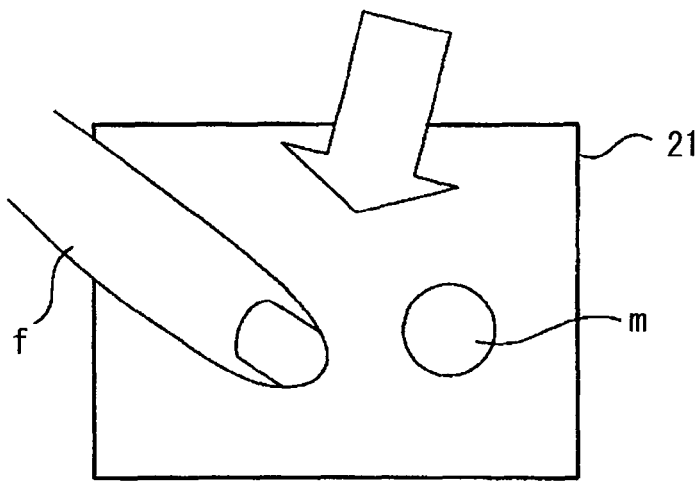
FIG. 21 is an illustration for describing a dynamic range of a light reception signal by the differential image fingertip extraction process.

Moreover, as shown in FIGS. 21(A) and (B), a dynamic range necessary to detect a light reception output voltage is determined as below. Here, FIG. 21(A) shows a touch state of the display area 21 of the panel, in which a finger f touches a panel surface, and a circular object m with reflectivity of substantially 100% is placed on the display area 21. In this state, a light reception output voltage on a line where both of the finger f and the object m are scanned is turned into a state shown in FIG. 21(B). Moreover, in FIG. 21(B), a voltage Von3 is a light reception output voltage in a state in which the backlight is on, and a voltage Voff3 is a light reception output voltage in a state in which the backlight is off.

Figure 21B:
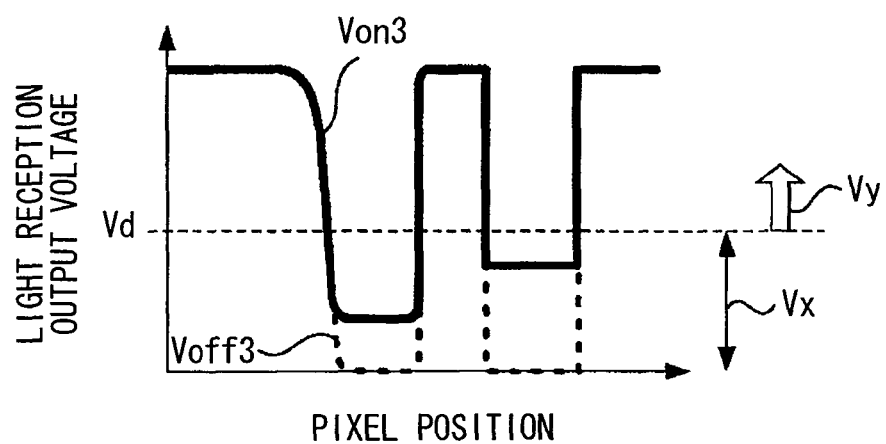

As shown in FIG. 21(B), at a point where the object m with reflectivity of approximately 100% is placed, a higher voltage than a voltage Vd detected when the backlight is on is at a level Vy which is not necessary to be observed, and a range Vx which is lower than the level is a dynamic range necessary for detection. Therefore, it should be understood that signals of level Vy which is unnecessary to be observed may be overflowed so as to be considered as a same level.

Moreover, also in the differential image fingertip extraction process, as in the case of the shadow image fingertip extraction process, information about a plurality of touching or proximity objects which are placed on the display area 21 of the I/O display panel 20 at the same time such as the position, the shape, the size or the like of each of the objects can be obtained.

Thus, in the display-and-image-pickup apparatus according to the embodiment, in consideration of the above-described shadow image fingertip extraction process and the above-described differential image fingertip extraction process, one of results of detecting the proximity object by these processes is outputted from the image processing section 14 to the application program execution section 11 as a final result.

FIG. 22 shows characteristics of the fingertip extraction processes in the shadow image fingertip extraction process and the differential image fingertip extraction process by comparison. In the drawing, "○" indicates that fingertip extraction under the corresponding condition is good, "Δ" indicates that the fingertip extraction process under the corresponding condition is changed to be good or poor depending on circumstances, and "×" indicates that the fingertip extraction process is poor under the corresponding condition in principle. As can be seen from the drawing, in a bright environment, the shadow image fingertip extraction process is more suitable for the fingertip extraction process, so an extraction result by the shadow image fingertip extraction process is used, but on the other hand, in the case where the backlight 15 is off, and display light is not emitted, or in a black display state, extraction may not be able to be performed by the differential image fingertip extraction process, so in this case, it is considered that an extraction result by the shadow image fingertip extraction process is used.

Moreover, in the display-and-image-pickup apparatus according to the embodiment, the reset image R obtained by picking up an image in a state in which the image pickup device is reset is subtracted from the shadow image A and the display light-using image B obtained by picking up an image of a proximity object through the use of external light or display light to remove an offset noise from the shadow image A and the display light-using image B, thereby the noise-processed images A' and B' are produced. Then, on the basis of the noise-processed images A' and B', the object information about the proximity object is obtained in consideration of the offset noise.

Further, in the display-and-image-pickup apparatus according to the embodiment, the object information about the proximity object is further obtained on the basis of the noise-processed images A" and B" produced by adding a predetermined bias value (bias) to the above-described noise-processed images A' and B'. Therefore, as will be described later, when the noise-processed image is stored in the frame memory 13A, certain image pickup data of a pixel can be prevented from being rounded off to 0 (being lost).

More specifically, in the case where the reset image R is subtracted from the shadow image A or the display light-using image B, a value in this case is considered to be positive in general; however, depending on pixels, the value may be negative. It is considered that it is because of dark current variations in the image pickup device (light reception sensor 31c) generated mainly in an exposure time. On the other hand, the frame memory 13A frequently stores only a positive value, and in the case where a negative value is generated, the value is rounded off to 0. At this time, in the case where the level of a signal which is desired to be taken out finally is very small, and the level is rounded off to 0 by an influence such as drift, a process result may be affected. The result has a large influence specifically in the case of a process of taking out a signal of the differential image C, and basically, the differential image C between the noise-processed image B' (=B−R) and the noise-processed image B' (=B−R) is C=B'−A'=B−A, so the differential image C is supposed to be equal to a differential image (=B−A) between images B and A before the noise process. However, in the case where the above-described rounding-off process is performed on the noise-processed images B' and A', depending on pixels, irrespective of the presence or absence of a signal, the value is rounded off to 0.

Here, referring to FIGS. 23 to 26, the reason for adding a predetermined bias value (bias) to the noise-processed images A' and B' will be described in detail below.

Figure 23A:
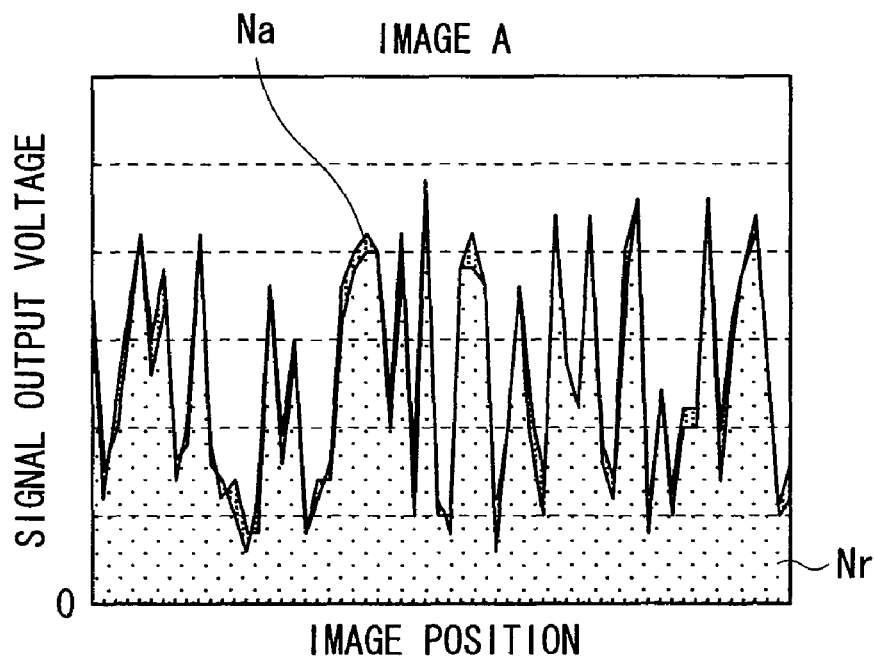
FIG. 23 is a plot for describing an example of a bias voltage.
Figure 23B:
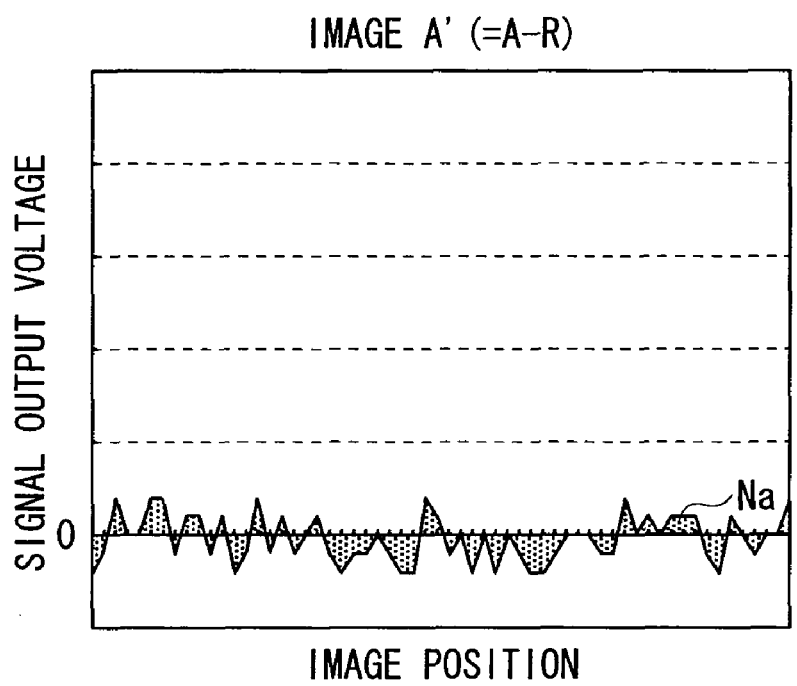
Figure 25A:
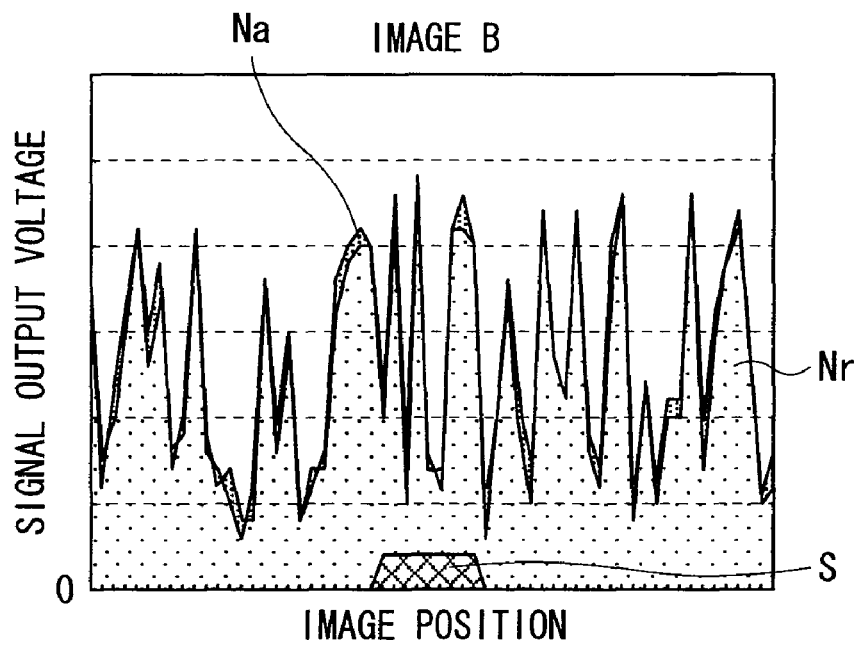
FIG. 25 is a plot for describing another example of the bias voltage.
Figure 25B:
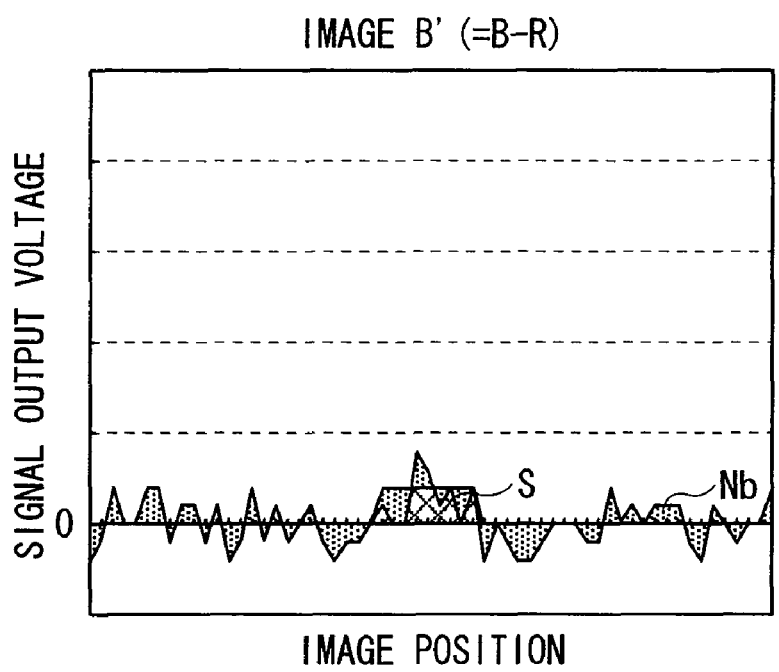

In the case where a pixel is marked, assuming that a signal output voltage of the pixel in the reset image R is Nr, noises generated in the pixel during the exposure of the shadow image A and the display light-using image B are Na and Nb, respectively, signal output voltages of the pixel in the shadow image A and the display light-using image B are Sa and Sb, respectively, and a signal component obtained by reflection from the proximity object when the backlight 15 is on is S, the signal output voltages Sa and Sb are represented by the following formulas (1) and (2) (refer to FIGS. 23(A) and 25(A)). In addition, the signal component S is an extremely small signal.

$$Sa=Nr+Na+0 \quad (1)$$

$$Sb=Nr+Nb+S \quad (2)$$

In general, variations in the signal output voltage Nr are very large, and variations in the signal output voltages Na and Nb are very small, compared to the signal output voltage Nr. Therefore, (Nr+Na) in the formula (1) and (Nr+Nb) in the formula (2) are designed to be constantly positive values. Herein, when the differential image (=B−A) between the display light-using image B and the shadow image A is considered, the signal output voltage value in a pixel is represented by the following formula (3), and as a noise, (Nb−Na) remains. However, in the case where the exposure times when obtaining the display light-using image B and the shadow image A are set to be substantially the same as each other, dark currents generated in these cases are substantially the same, so (Nb−Na) as a noise component is approximately 0, and a very small signal component S can be taken out finally.

$$Sb-Sa=S+(Nb-Na) \quad (3)$$

On the other hand, in the display-and-image-pickup apparatus according to the embodiment, after a noise component Nr is subtracted from the signal output voltages Sa and Sb to obtain noise-processed images A' and B', the differential image C (=B''−A'') is determined. Herein, the signal output voltages in the pixels in the noise-processed images A' and B' are represented by the following formulas (4) and (5), respectively (refer to FIGS. 23(B) and 25(B)). The noise components Na and Nb are very small, but depending on pixels, the noise components Na and Nb show a positive value or a negative value, so a value after a rounding-off process is a value ranging from 0 to Na (0 with approximately a one-in-two chance) in the formula (4), and in the formula (5), in the case where the amplitude of the signal component S is equivalent to the amplitude of the noise component Nb, the value is within a range from 0 to (S+Nb). Therefore, in the noise-processed images A' and B', the signal output voltage becomes 0 depending on pixel position, and as shown in an image A'1 in FIG. 24 and an image B'1 in FIG. 26, the signal may be lost depending on pixel position. Moreover, the value of a signal output voltage ((Sa−Nr)−(Sb−Nr)) in the pixel in the differential image between the noise-processed images A' and B' is distributed in a range from 0 to (S+(Nb−Na))≈S, so a value in a range from 0 to S is taken depending on the pixel, thereby variations occur. When such variations occur, in the shadow image fingertip extraction process or the differential image fingertip extraction process, detection accuracy of object information declines.

$$Sa-Nr=Na \quad (4)$$

$$Sb-Nr=Nb+S \quad (5)$$

Therefore, in the display-and-image-pickup apparatus according to the embodiment, to prevent the above issue, as shown by the following formulas (6) and (7), noise-processed images A'' and B'' produced by adding a sufficient bias value (bias) for preventing the loss of a signal by the rounding-off process to the noise-processed images A' and B' are preferably used. Moreover, such a certain bias value (bias) may be determined to be a value making a signal of each pixel position in FIGS. 23(B) and 25(B) constantly positive, that is, the bias value may be determined on the basis of an image which is obtained by removing an offset noise from a dark-state image obtained by an image pickup process when the environment around the display-and-image-pickup apparatus is in a dark state.

$$\text{Noise-processed image } A''=A'+\text{bias}=A-R+\text{bias} \quad (6)$$

$$\text{Noise-processed image } B''=B'+\text{bias}=B-R+\text{bias} \quad (7)$$

Figure 24:
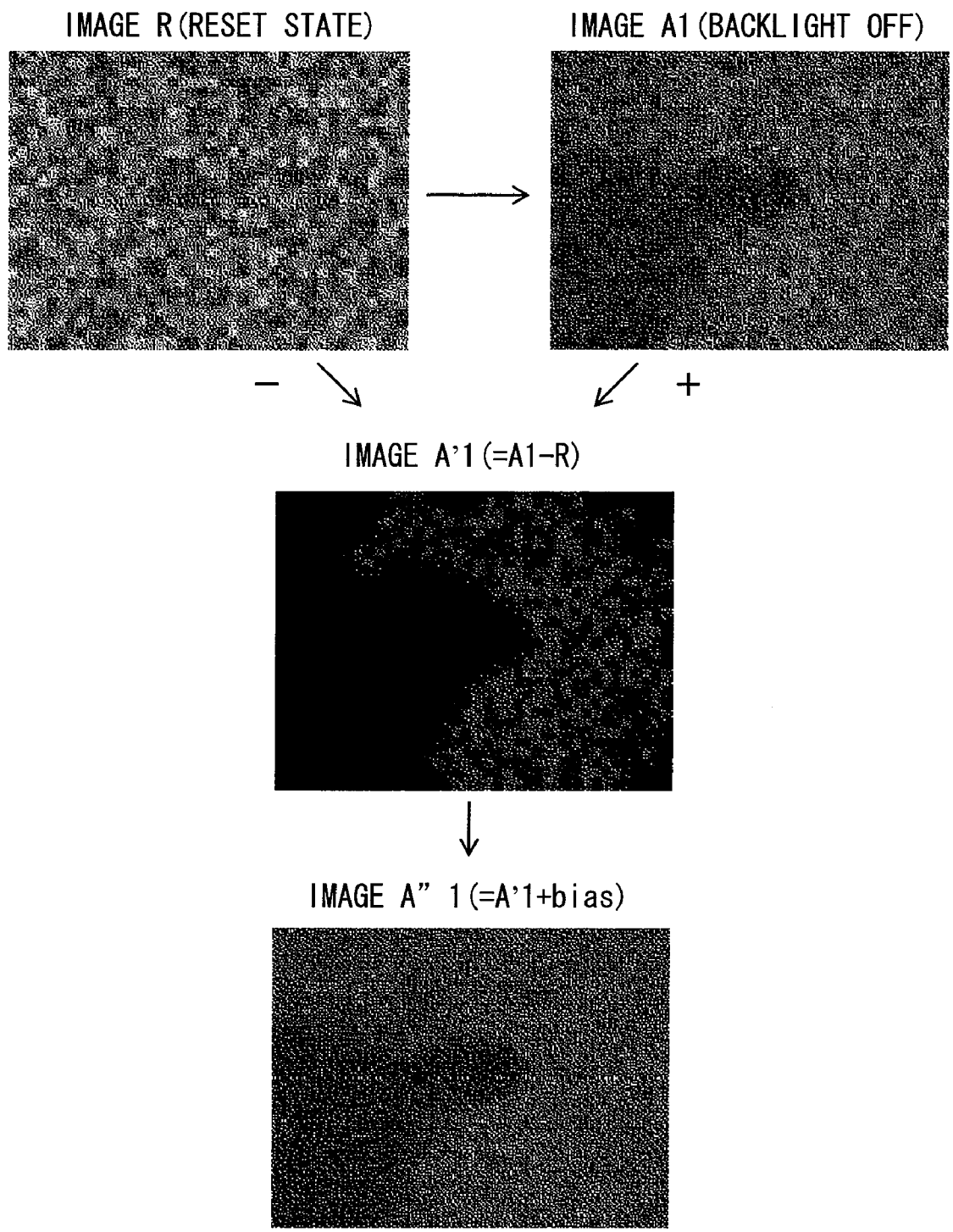
FIG. 24 is a photographic view for describing an example of an effect in the case where a bias voltage is added.
Figure 26:
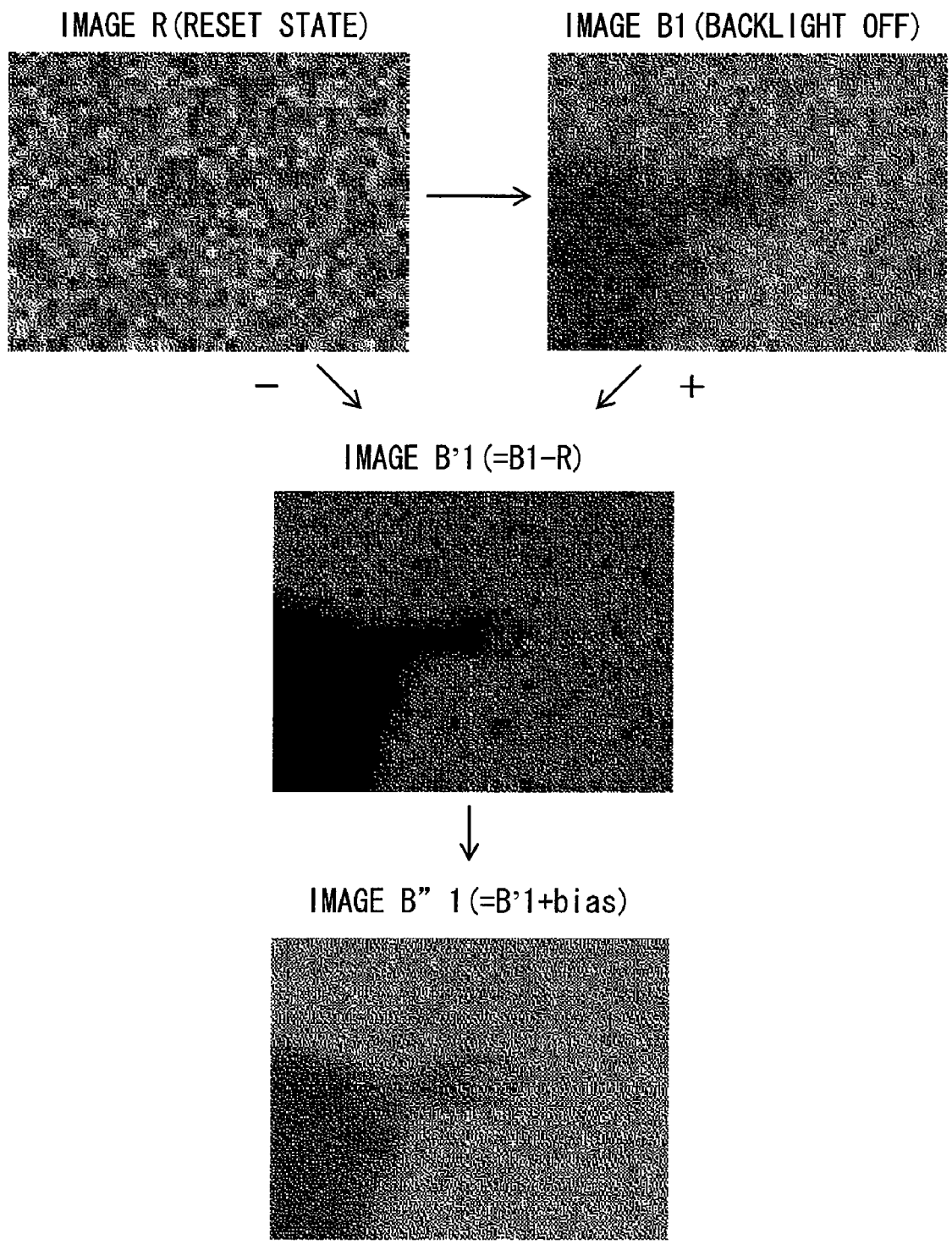
FIG. 26 is a photographic view for describing another example of the effect in the case where the bias voltage is added.

Moreover, the signal output voltages in the pixels in the noise-processed image A'' and B'' are as shown in the following formulas (8) and (9), and show positive values (the signal output voltages are prevented from being rounded off) (refer to an image A''1 in FIG. 24 and an image B''1 in FIG. 26). Therefore, the signal output voltage in the pixel in the differential image C (=B''−A'') is as shown in the following formula (10), and is the same as the differential image (=B−A) between the display light-using image B and the shadow image A shown in the formula (3). Therefore, in the differential image fingertip extraction process on the basis of the differential image C, a decline in the detection accuracy of the object information by the rounding-off process is prevented, and as can be seen from a comparison between the formula (3) and the formula (10), the same result is obtained without an influence by adding the bias value (bias).

$$Sa-Nr+\text{bias}=Na+\text{bias}>0 \quad (8)$$

$$Sb-Nr+\text{bias}=Nb+S+\text{bias}>0 \quad (9)$$

$$(Nb+S+\text{bias})-(Na+\text{bias})=S+(Nb-Na) \quad (10)$$

On the other hand, in the shadow image fingertip extraction process, as described above, the object information is detected by an image E (=(MA'')−A''−TH) on the basis of the noise-processed image A'', the moving average image (MA'') of the noise-processed image A'' and the predetermined threshold value TH. Here, when the influence of the bias value (bias) in the moving average image (MA'') is considered, the bias value (bias) uniformly added to the whole picked-up image is also uniformly added to the moving average image (MA''), so in the image E, the influence by adding the bias value (bias) is eliminated. Moreover, in the shadow image fingertip extraction process, the object information is detected on the basis of the noise-processed image A'' on which the rounding-off process is not performed, so a decline in the detection accuracy of the object information by the rounding-off process is prevented.

Next, referring to FIGS. 27 to 30, some execution examples of an application program by the application program execution section 11 using object position information or the like detected by the above-described fingertip extraction process will be described below.

Figure 27A:
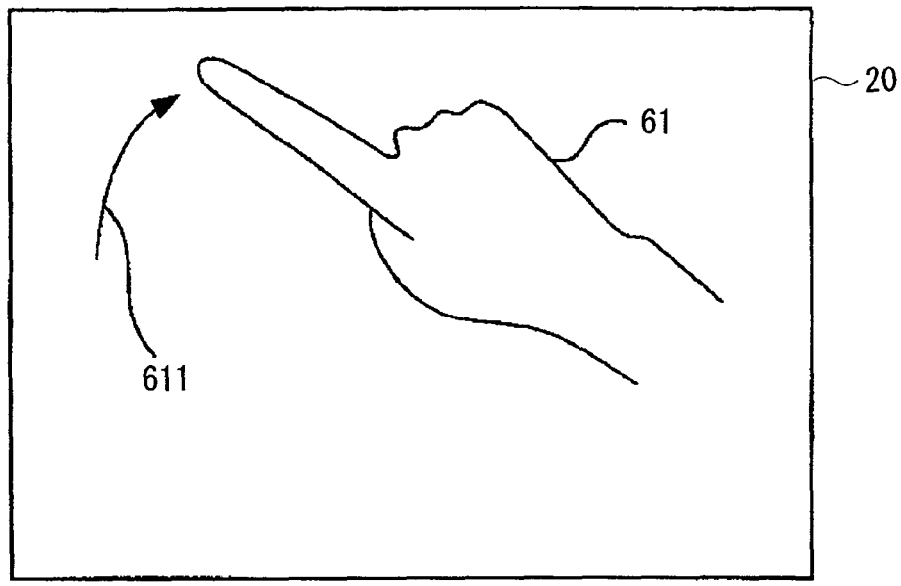
FIG. 27 is an illustration for describing an example of an application using a result by the fingertip extraction process.

At first, an example shown in FIG. 27(A) is an example in which when a fingertip 61 touches a surface of the I/O display panel 20, a trail of points where the fingertip 61 touches is displayed on a screen as a drawing line 611.

Figure 27B:
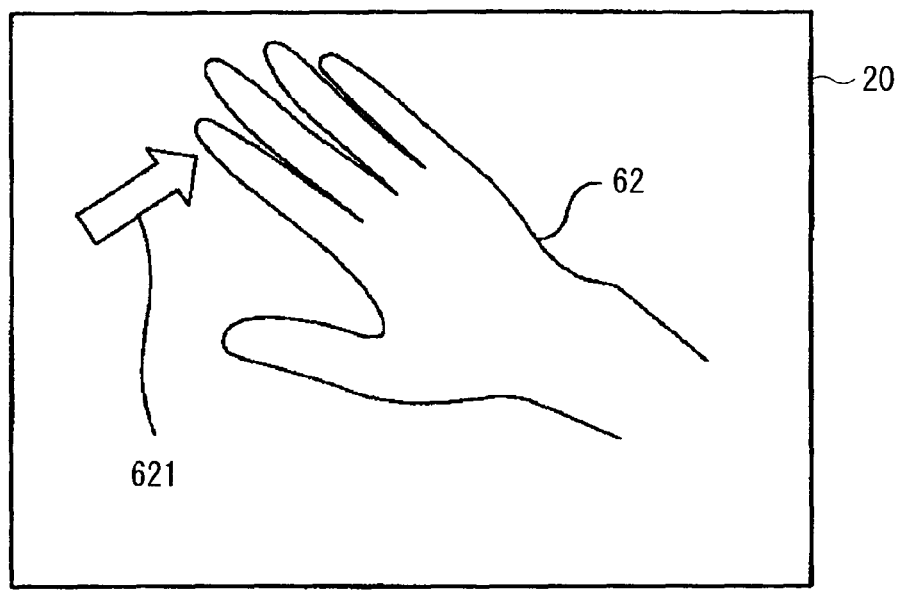

Moreover, an example shown in FIG. 27(B) is gesture recognition using the shape of a hand. More specifically, the shape of a hand 62 which touches (or comes in proximity to) the I/O display panel 20 is recognized, and the shape of the recognized hand is displayed as an image, and some processes is performed on the image by a movement 621 of a displayed object.

Figure 28:
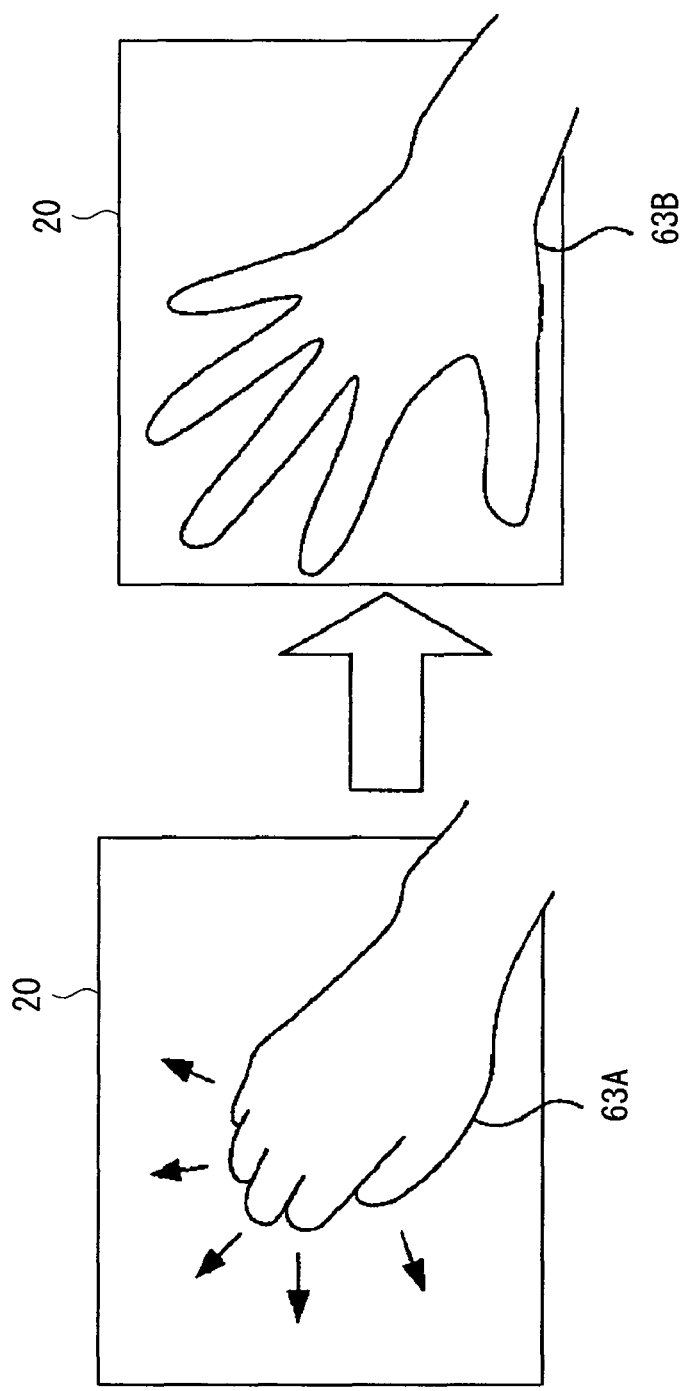
FIG. 28 is an illustration for describing another example of the application using the result by the fingertip extraction process.

Further, an example shown in FIG. 28 is that by changing from a hand 63A in a closed state to a hand 63B in an opened state, the hands touching or coming in proximity in both states are image-recognized by the I/O display panel 20 to execute a process on the basis of these image recognitions. When the process is performed on the basis of these recognitions, for example, an instruction such as zoom-in can be performed. Moreover, as such an instruction can be performed, for example, the I/O display panel 20 can be connected to a personal computer, and an operation of switching a command on the computer or the like can be inputted by these image recognitions in a more natural way.

Figure 29:
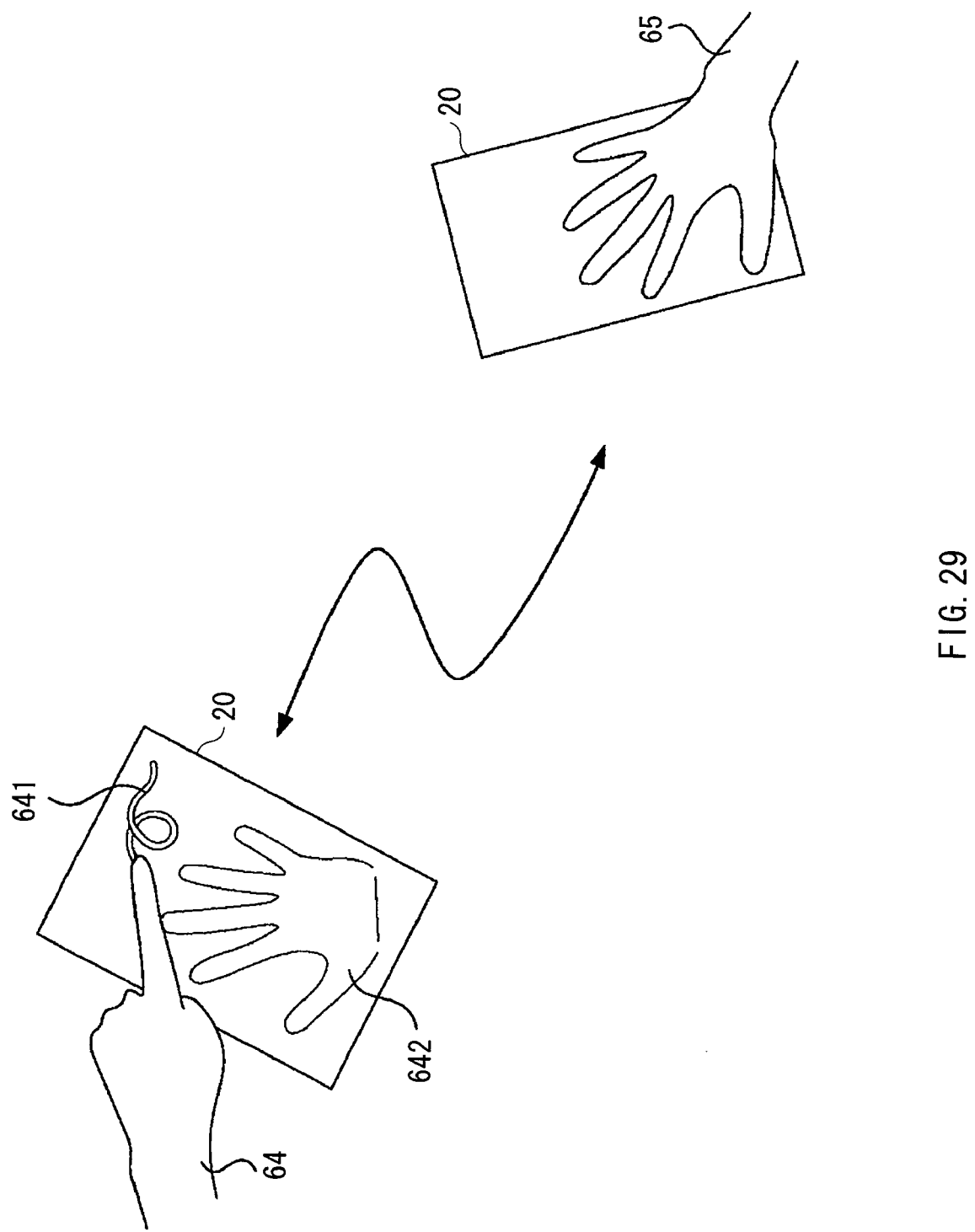
FIG. 29 is an illustration for describing still another example of the application using the result by the fingertip extraction process.

Moreover, for example, as shown in FIG. 29, when a plurality of I/O display panels 20 are prepared, and the plurality of I/O display panels 20 are connected to one another by some transmission means, users operating the I/O display panels 20 may communicate with each other by transmitting and displaying an image obtained by detecting an object touching or coming in proximity to one I/O display panel 20 to and on another I/O display panel 20. In other words, as shown in FIG. 29, two I/O display panel 20 are prepared, and a process of transmitting the shape of a hand 65 which is image-recognized in one panel to the other panel so that a hand shape 642 is displayed on the other panel, or a process of transmitting and displaying a track 641 displayed by touching one panel by a hand 64 to and on the other panel can be performed. Thus, the I/O display panel 20 which transmits a drawing state as a moving image, and transmits a handwriting character, symbol or the like to other users may be a potential new communication tool. As such an example, it is expected that, for example, the I/O display panel 20 is applied to a display panel of a cellar phone or the like.

Figure 30:
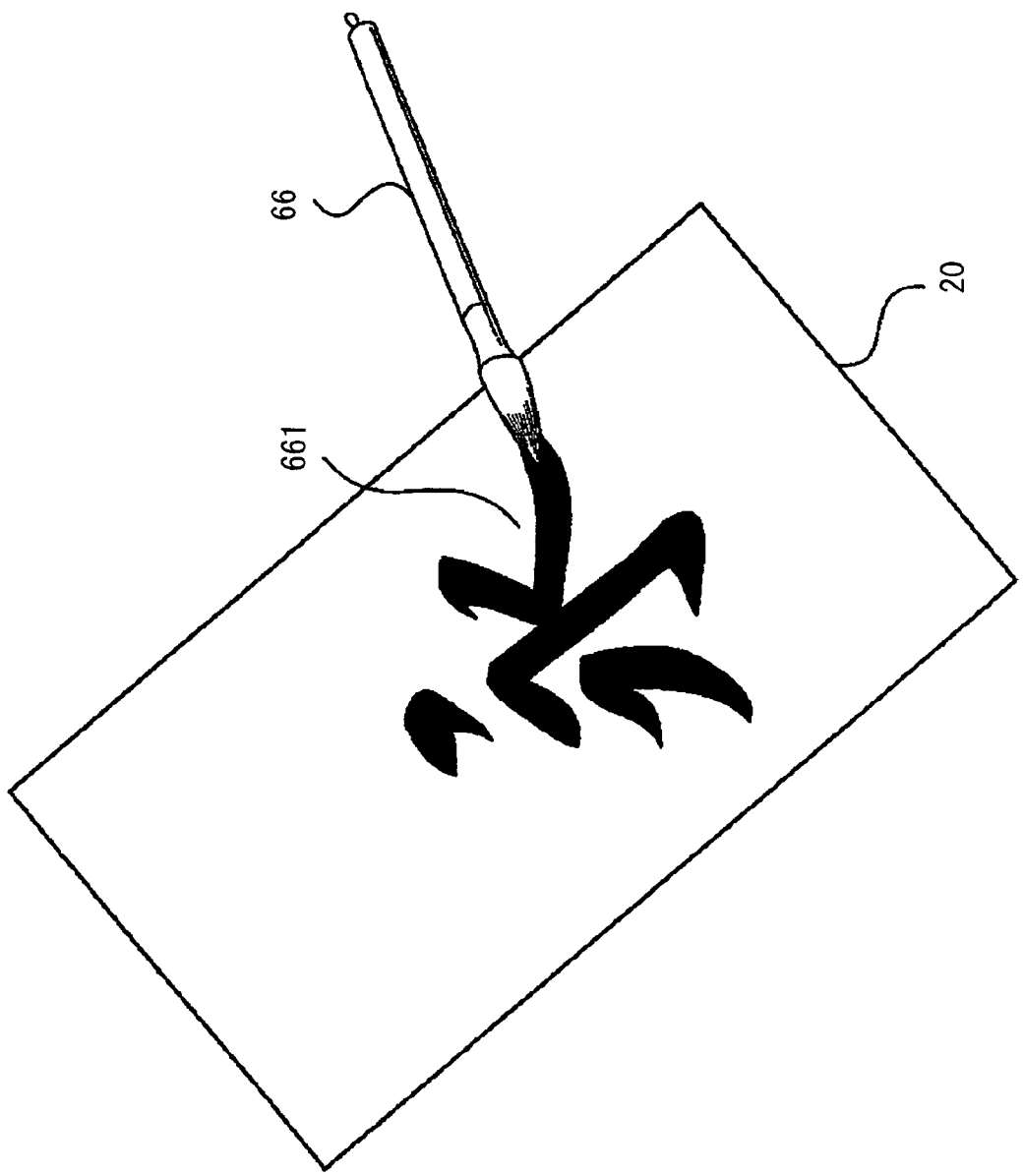
FIG. 30 is an illustration for describing a further example of the application using the result by the fingertip extraction process.

Moreover, for example, as shown in FIG. 30, a brush 66 is used, and touches a surface of the I/O display panel 20 so as to draw a character, and a point where the brush 66 touches is displayed on the I/O display panel 20 as an image 661, thereby an handwriting input by a brush is possible. In this case, a fine touch by a brush can be recognized and displayed. In handwriting recognition in a related art, for example, in some digitizers, the inclination of a special pen is reflected in display by detecting an electric field; however, in the example, a surface where a real brush touches is detected, thereby information input is performed with a more realistic sense.

As described above, in the embodiment, an offset noise (the reset image R) is obtained by an image pickup process in a state in which an image pickup device is initialized (a reset state), and object information about a proximity object is obtained in consideration of the offset noise on the basis of a picked-up image (the shadow image A or the display light-using image B) which is obtained by picking up an image of the proximity object, so while the offset noise in the apparatus is easily reduced, the object information about the proximity object can be obtained. Therefore, the detection accuracy of a touching or proximity object can be easily improved.

Moreover, the differential image C between the image B (the display light-using image) obtained by picking up an image of the proximity object through the use of display light and the image A (the shadow image) obtained by picking up an image of a shadow of the proximity object is produced, and the object information about the proximity object is detected in consideration of the image A (the shadow image) and the differential image C, so irrespective of use conditions at the time such as, for example, surrounding conditions or the intensity of display light, the detection of an object can be performed.

Further, a reset image (an offset noise) is obtained through the use of a period of a reset state which exists in a one-frame display period before, so it is not necessary to change a control timing from the related art. Therefore, even in the case of the embodiment in which a non-Si substrate having smaller mobility of electrons than a Si substrate is used, the readout periods of the images A, B and R and the fingertip extraction period can be sufficiently secured.

Moreover, the fingertip extraction process is performed through the use of the noise-processed images A" and B" obtained by adding the predetermined bias value (bias) to the noise-processed images A' and B', so the loss of a signal by the rounding-off process can be prevented, and the detection accuracy of the object information can be further improved.

Further, the moving average image MA" is produced on the basis of the noise-processed image A", and object information is detected through the use of the differential image D between the moving average image MA" and the original image A" and the image E produced by subtracting the threshold value TH from each pixel data of the differential image D, and the size of the pixel region 50 in averaging arithmetic processing is set to be equivalent to a size (a target size) expected as an object to be detected; therefore, for example, only a fingertip portion with a size equivalent to the target size is detected, and a fist portion which is larger than the fingertip can be prevented from being detected, so a more reliable detection process can be performed.

Moreover, the image A" (the shadow image) is obtained before obtaining the image B" (the display light-using image) in one operation period (a one-frame display period); therefore, for example, as shown in FIG. 7, the time of performing the arithmetic operation of the moving average image (MA") which takes some time can be secured before performing the differential image fingertip extraction process, and compared to the case where the image B is obtained before obtaining the image A, the whole process can be performed for a shorter time.

Further, in a one-frame display period as a unit operation cycle period, a process of obtaining the reset image R (the offset noise) is performed only in one reset state (more specifically, a reset state in a non-lighting period in which the backlight 15 is off in the embodiment) of reset states existing in both of the non-lighting period and a lighting period in which the backlight 15 is on, so compared to the case where the obtaining process is performed in both of the reset states, power consumption of an apparatus can be reduced.

In addition, in the embodiment, the differential image fingertip extraction process is a main process, and the shadow image fingertip extraction process is a sub process; however, in some cases, the differential image fingertip extraction process may be a sub process, and the shadow image fingertip extraction process may be a main process.

Second Embodiment

Next, a second embodiment of the invention will be described below. A display-and-image-pickup apparatus according to the embodiment selects one of the differential image fingertip extraction process and the shadow image fingertip extraction process on the basis of a predetermined indicator, and performs the fingertip extraction process on the basis of a selected image. In addition, other configuration and operations are the same as those in the first embodiment, and will not be further described.

Figure 31:
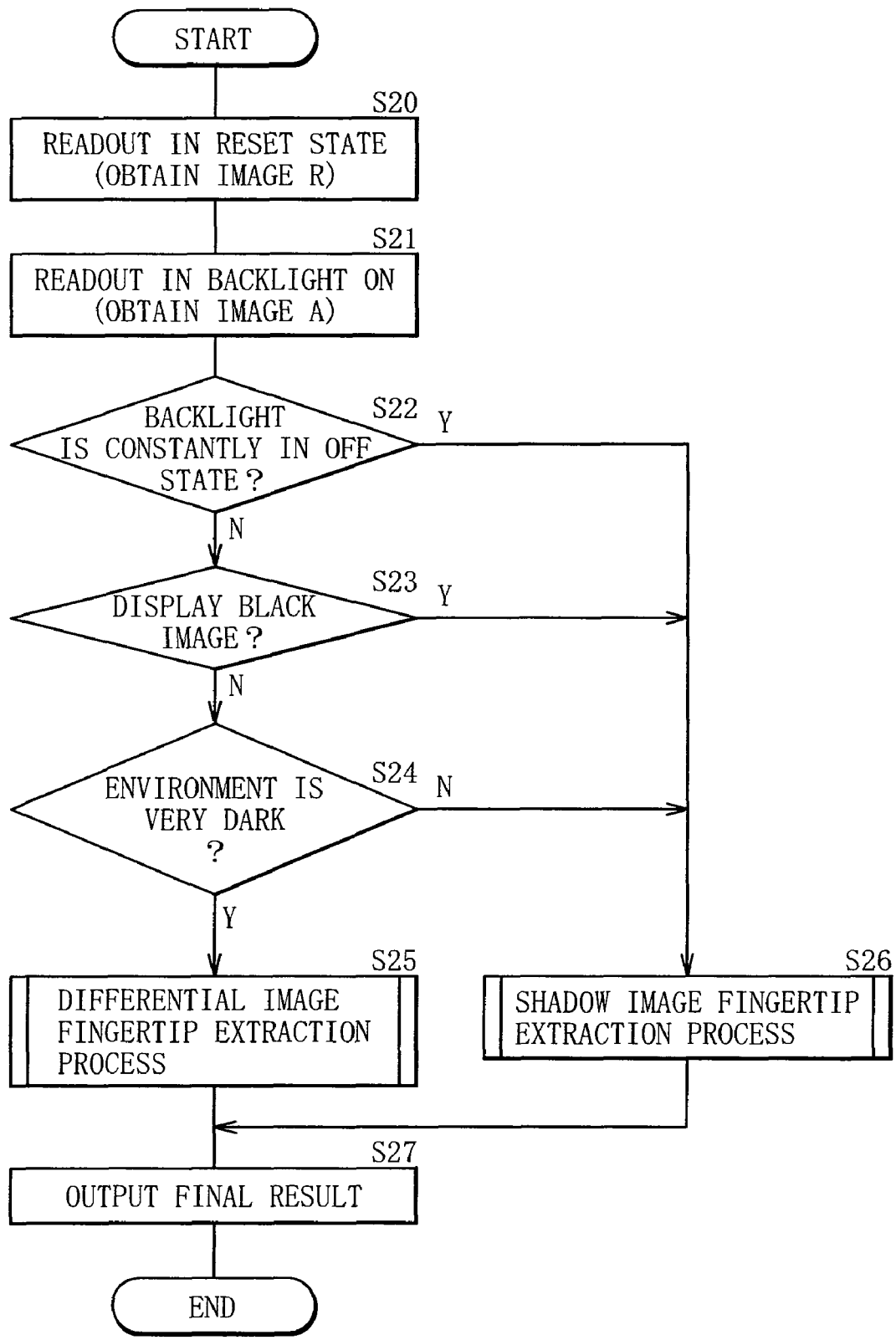
FIG. 31 is a flow chart showing a fingertip extraction process according to a second embodiment.

FIG. 31 shows a flow chart of the fingertip extraction process according to the embodiment. As can be seen from the drawing, when the image R (the reset image) and the image A (the shadow image) are respectively obtained as in the case of the first embodiment (steps S20 and S21), as can be seen from a comparative chart shown in FIG. 22, a process in which the fingertip extraction process is securely performed is selectively performed depending on circumstances by the image processing section 14 (steps S22 to S26).

More specifically, in a state in which the backlight is constantly off, when a black image is displayed, and in the case where the environment is not dark, the shadow image fingertip extraction process (step S26) is selectively executed to output a final result (step S27). Moreover, whether the environment is dark or not is determined by the size of pixel data in the shadow image A (or the noise-processed image A' or the noise-processed image A"), and in the case where the pixel data is very small, it is determined that the environment is very dark.

On the other hand, in a state in which the backlight is not constantly off, when a black image is not displayed, and in the case where the environment is very dark, the differential image fingertip extraction process (step S25) is selectively executed to output a final result (step S27).

As described above, in the embodiment, the same effects can be obtained by the same functions as those in the first embodiment. More specifically, while the offset noise in the apparatus is easily reduced, the object information about the proximity object can be obtained, and the detection accuracy of a touching or proximity object can be easily improved.

Moreover, one of the differential image fingertip extraction process and the shadow image fingertip extraction process is selected on the basis of a predetermined indicator, and the finger extraction process is performed on the basis of a selected image, so a suitable process of the fingertip extraction processes is applicable. Therefore, compared to the first embodiment, the second embodiment can respond to various use conditions, and an extraction process can be performed more reliably.

Third Embodiment

Next, a third embodiment of the invention will be described below. A display-and-image-pickup apparatus according to the embodiment performs both of the differential image fingertip extraction process and the shadow image fingertip extraction process in any cases, and performs the fingertip extraction process through the use of an image synthesized from the image A (shadow image) and the differential image C. In addition, other configurations and operations are the same as those in the first embodiment, and will not be further described.

Figure 32:
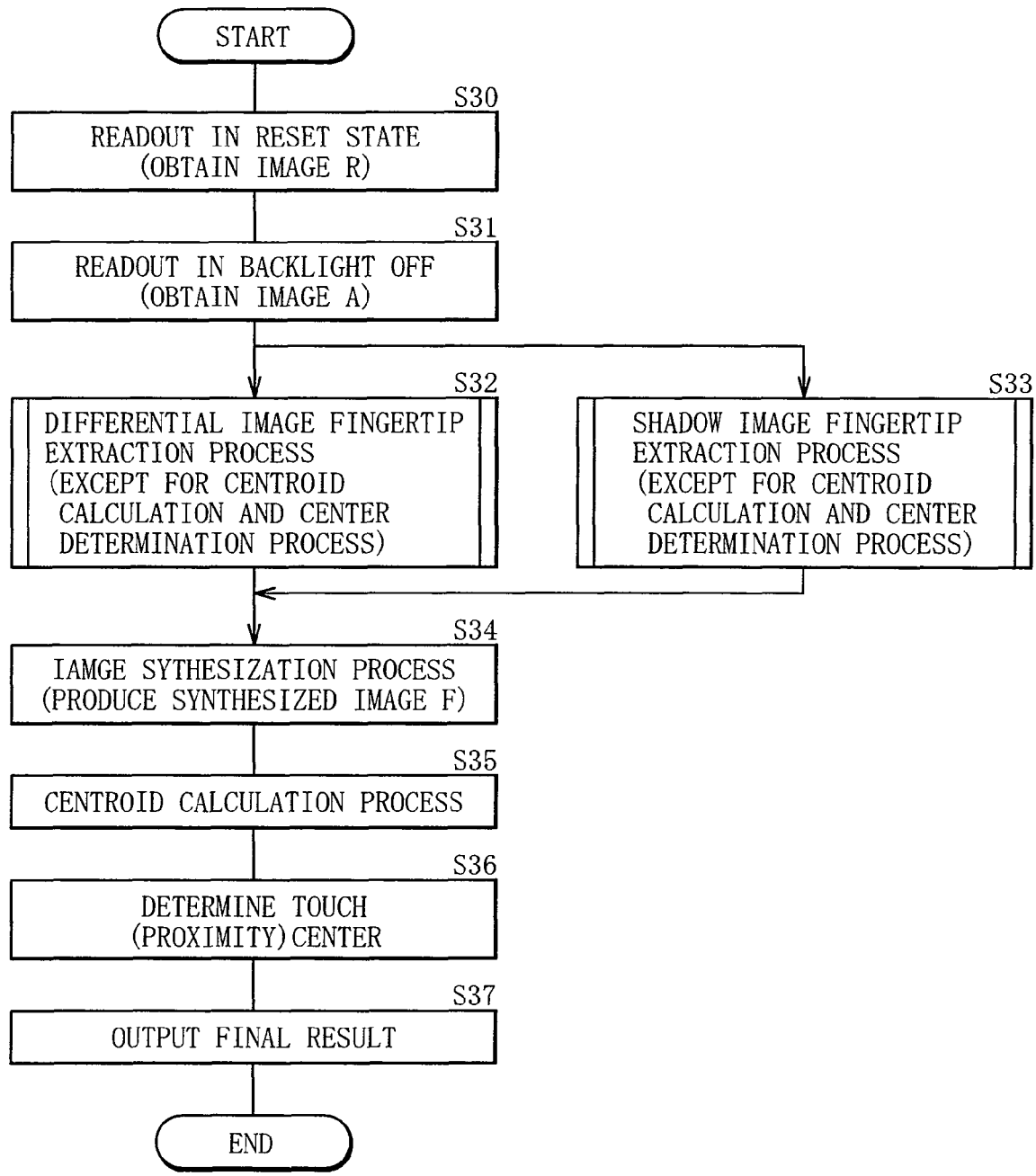
FIG. 32 is a flow chart showing a fingertip extraction process according to a third embodiment.

FIG. 32 shows a flow chart of the fingertip extraction process according to the embodiment. As can be seen from the drawing, as in the cases of the first and second embodiments, when the image R (the reset image) and the image A (the shadow image) are obtained (steps S30 and S31), the differential image fingertip extraction process and the shadow image fingertip extraction process are respectively executed except for the centroid calculation process and the touch (proximity) center determination process (steps S32 and S33).

Figure 33:
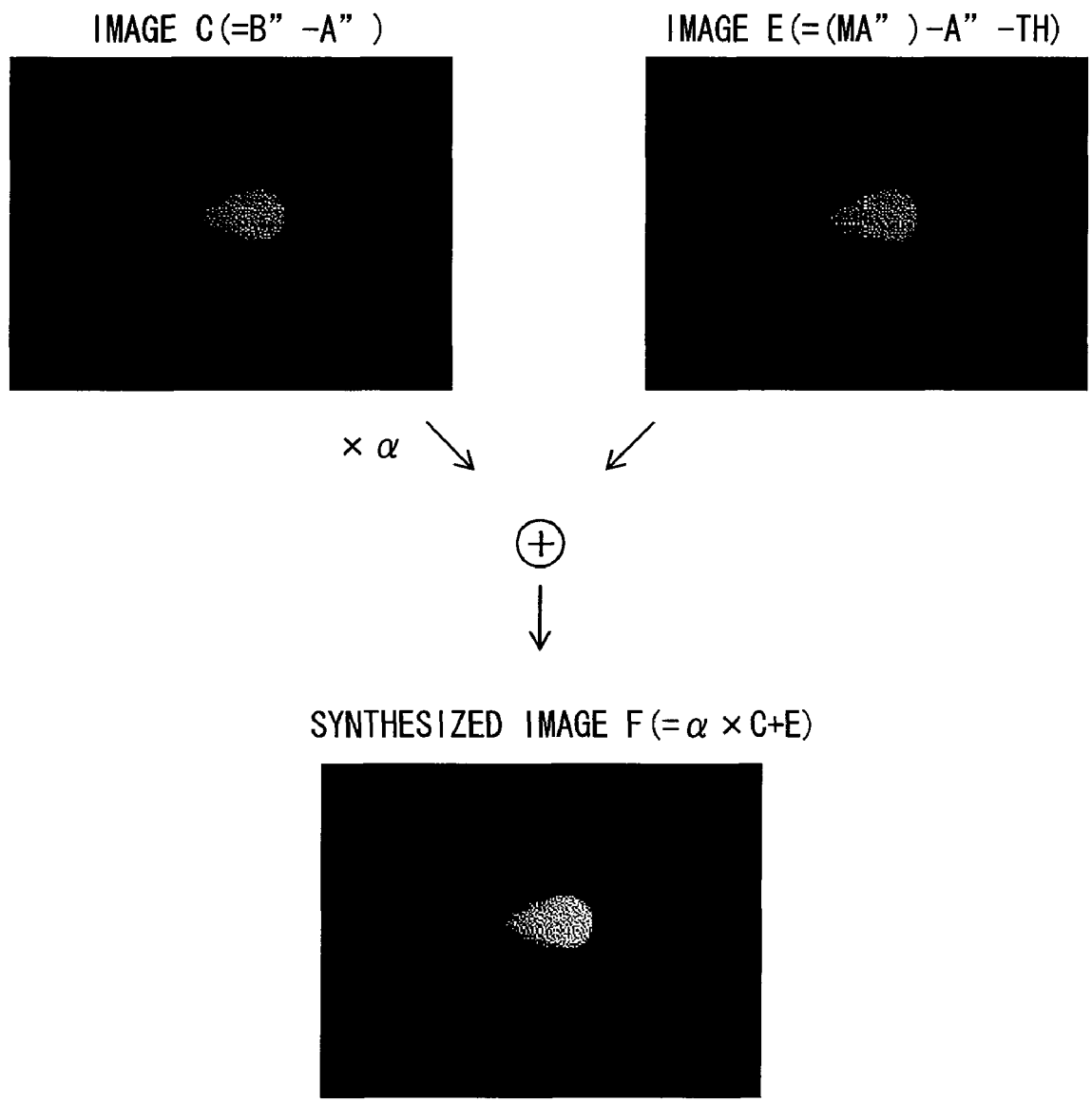
FIG. 33 is a photographic view for describing an image synthesizing process shown in FIG. 32.

Next, for example, as shown in FIG. 33, a synthesized image $F=\alpha \times C+E$ which is synthesized from the differential image C produced by the differential image fingertip extraction process and the image E produced by the shadow image fingertip extraction process is produced (step S34). In addition, $\alpha$ indicates a predetermined weighting coefficient.

Then, after that, as in the case of the first embodiment, the centroid calculation process (step S35), the touch (proximity) center determination process (step S36) and a final result output process (step S37) are performed.

As described above, in the embodiment, the same effects can be obtained by the same functions as those in the first and the second embodiments. More specifically, while the offset noise in the apparatus is easily reduced, the object information about the proximity object can be obtained, and the detection accuracy of the touching or proximity object can be easily improved.

Moreover, in any cases, both of the differential image fingertip extraction process and the shadow image fingertip extraction process are performed, and the synthesized image $F=\alpha \times C+E$ which is synthesized from the differential image C produced by the differential image fingertip extraction process and the image E produced by the shadow image fingertip extraction process is produced, and the fingertip extraction process is performed on the basis of the synthesized image F; therefore, for example, as shown in FIG. 33, an image such as a fingertip can be detected more clearly. Therefore, compared to the first embodiment, the extraction process can be performed more reliably.

Although the present invention is described referring to the first to third embodiments, the invention is not limited to the embodiments, and may be variously modified.

For example, in the above described embodiments, the case where the frame memory 13A stores only a positive value is described; however, in the case where a frame memory can store a negative value, and a rounding-off process is not performed, the bias value (bias) is not necessarily added to the noise-processed images A' and B'. In such a configuration, the offset noise process can be simpler, and the process of detecting the object information can be performed more easily.

Moreover, in the above-described embodiments, the case where the threshold value TH used when producing the image E(=D−TH) is a fixed value is described; however, for example, in the case where the threshold value TH is represented by a function of the moving average image (MA"), that is, TH=f(MA"), compared to the case of the function of the moving average image (MA), the bias value (bias) is added, so the influence of the bias value may be removed (TH=f (MA"−bias may be used). In such a configuration, as in the case of the above-described embodiments, an influence by adding the bias value (bias) can be prevented.

Further, in the above-described embodiments, the case where the process of obtaining the reset image R (offset noise) is performed in each unit operation cycle period (a one-frame display period) is described; however, the process of obtaining the offset noise may be performed only at the time of one reset state in a plurality of unit operation cycle periods to the extent that the offset noise is not temporally changed. In such a configuration, compared to the above-described embodiments, the power consumption of the apparatus can be further reduced.

Figure 34A:
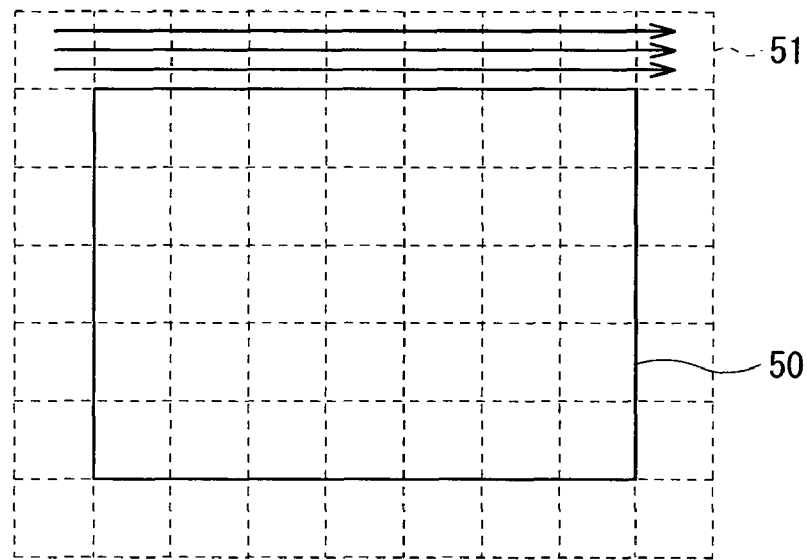
FIG. 34 is an illustration for describing a moving average image producing process according to a modification example of the invention.
Figure 34B:
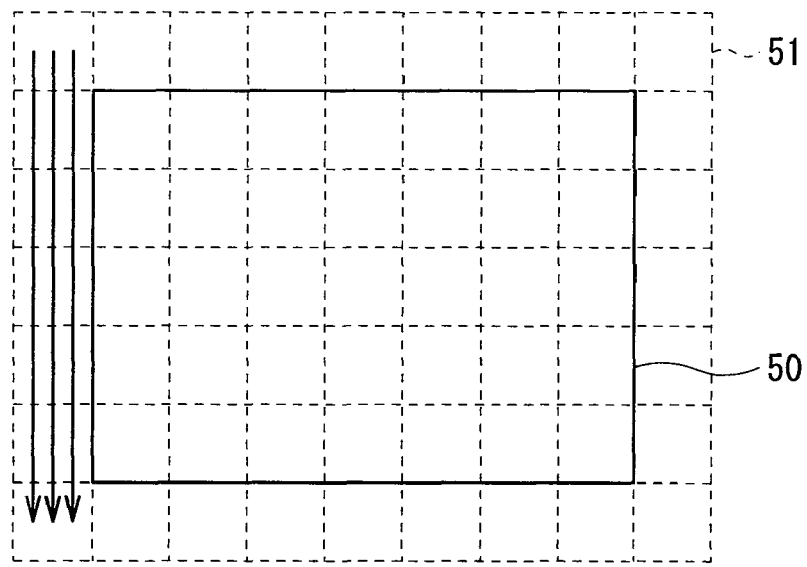

Moreover, in the process of producing the moving average image according to the invention, when the averaging image processing is performed, target pixels may be reduced, and arithmetic operation may be performed on the reduced target pixels so as to reduce processes. For example, as shown in FIGS. 34(A) and (B), while a marked pixel is sequentially shifted along one pixel direction, averaging arithmetic processing is performed only on pixels on the one pixel direction, and after that, while a marked pixel is sequentially shifted along another pixel direction, averaging arithmetic processing may be performed only on pixels on the other pixel direction. Further, a dot addition process to a predetermined direction may be performed through the use of arithmetic circuits 70 to 73 as shown in FIGS. 35(A) and (B).

Further, in the above-described embodiments, the moving average image MA is produced from the original image A, and the size of the pixel region 50 in the moving average arithmetic processing is set on the basis of the size expected as an object to be detected (a target size a), thereby in the moving average image MA, an image with a larger size than the pixel region 50, that is, an image with a higher spatial frequency than that of the pixel region 50 (in this case, a fingertip image) is removed finally, and an image with a lower spatial frequency than that of the pixel region 50 (in this case, the shadow image) is removed by determining a difference between the moving average image MA and the original image A, and only an image with a high spatial frequency (in this case, the fingertip image) is extracted. In other words, in the above-described embodiments, as an example of such a high-frequency pass filter and a method allowing the simplest and high-speed process, a method of determining a difference between the moving average image MA and the original image A is described. Therefore, the method of determining the difference is not limited to the methods described in the above embodiments, and both of a low-frequency pass filter process and a difference process may be performed at a time through the use of another high-frequency pass filter.

Figure 36:
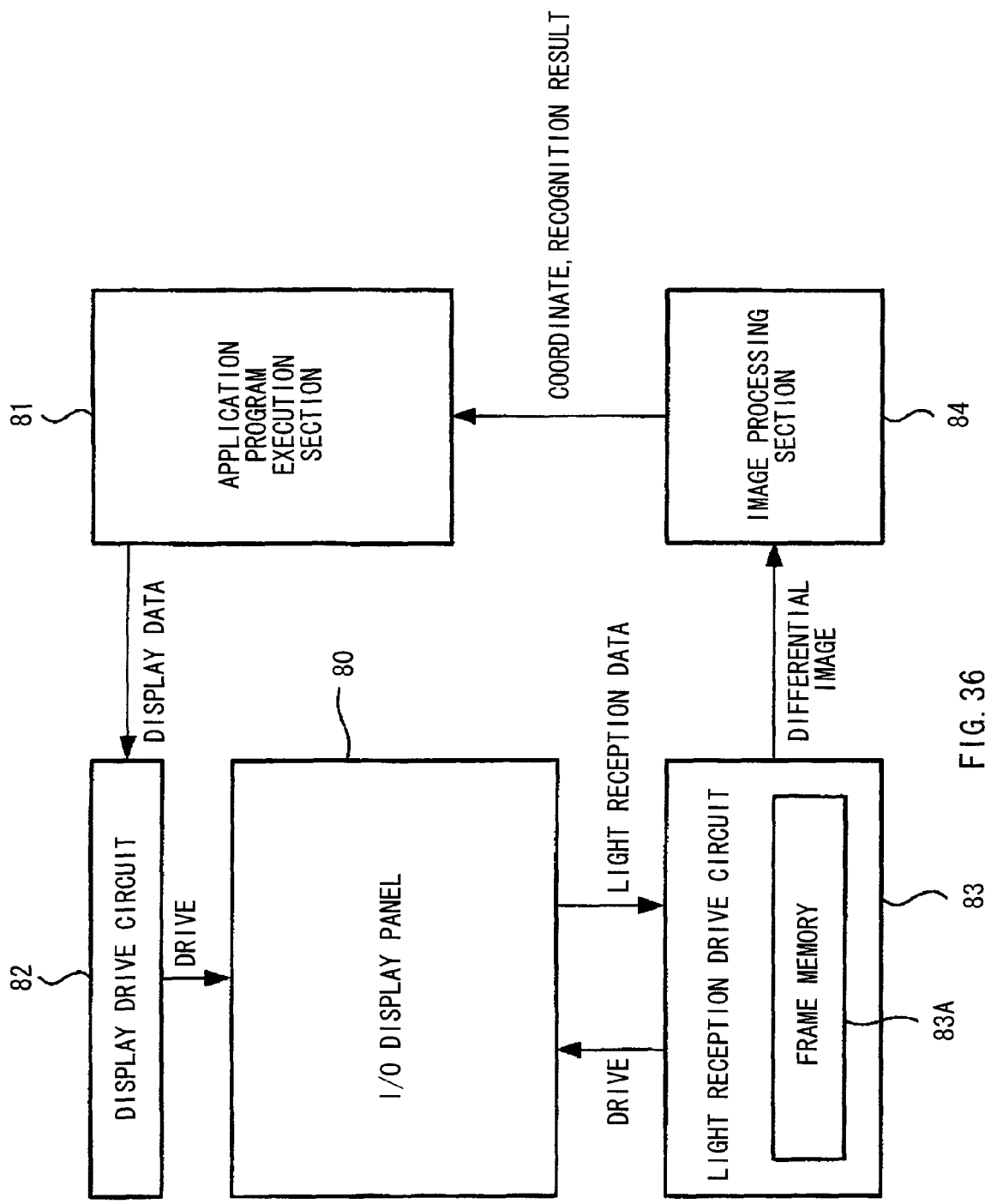
FIG. 36 is a block diagram showing a configuration of a display-and-image-pickup apparatus according to a modification example of the invention.
Figure 37:
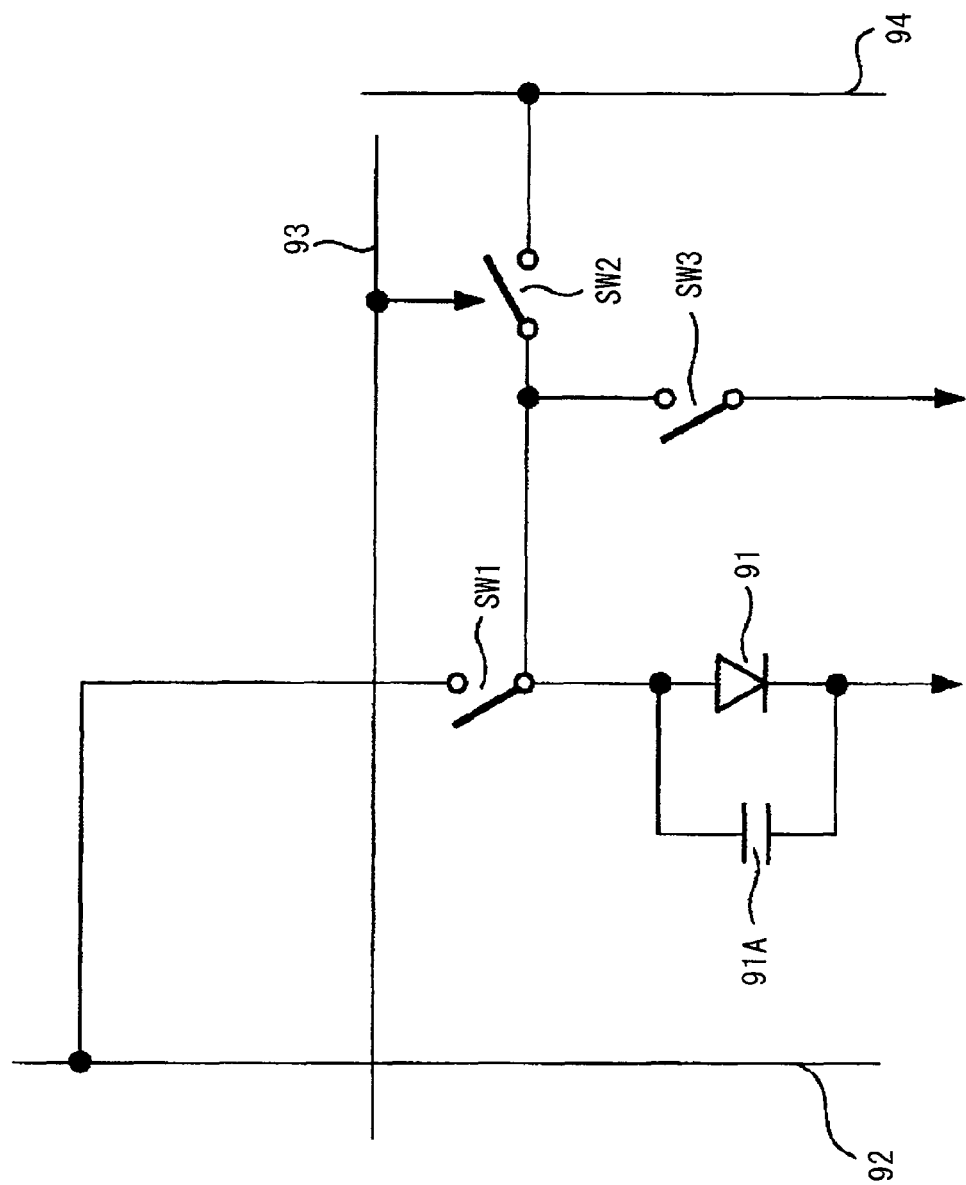
FIG. 37 is a circuit diagram showing a configuration example of each pixel in the display-and-image-pickup apparatus shown in FIG. 36.

Moreover, in the above-described embodiments, the case where in the I/O display panel 20, a display device is a liquid crystal device, and a light-receiving device is separately arranged is described; however, like a display-and-image-pickup apparatus shown in FIGS. 36 and 37, for example, like an organic EL (ElectroLuminescence) device, a light-emitting/receiving device (a display image pickup device) capable of performing a light-emitting operation and a light-receiving operation by time division may constitute an I/O display panel (an I/O display panel 80). In such a configuration, the same effects as those in the above-described embodiments can be obtained. In addition, a period in which display light is not emitted in this case is a period in which the light-emitting operation by the display image pickup device is not performed.

Further, in the above-described embodiments, the display-and-image-pickup apparatus including a display image pickup panel (the I/O display panel 20) which includes a plurality of display devices and a plurality of image pickup devices is described; however, the invention is applicable to an image pickup apparatus which includes an image pickup panel including a plurality of image pickup devices and not including a display device. Therefore, the image B used in the differential image fingertip extraction process is not limited to the display light-using image more typically, and the image B may be an illumination-light-using image produced through the use of illumination light from an image pickup panel.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An image pickup apparatus comprising:
   an image pickup panel including a plurality of image pickup devices;
   an image pickup control means for controlling the image pickup devices so as to obtain an offset noise by an image pickup process in a state in which the image pickup devices are initialized; and
   an image processing means for obtaining object information as information about at least one of the position, the shape and the size of a proximity object in consideration of the offset noise on the basis of a picked-up image which is obtained by picking up an image of the proximity object.

2. The image pickup apparatus according to claim 1, wherein
   the image processing means obtains the object information in consideration of the offset noise on the basis of a shadow image which is obtained by picking up an image of a shadow of the proximity object.

3. The image pickup apparatus according to claim 2, wherein
   the image processing means obtains the object information on the basis of a noise-processed image which is obtained by removing the offset noise from the shadow image.

4. The image pickup apparatus according to claim 3, wherein
   the image processing means obtains the object information on the basis of an image which is obtained by adding a predetermined bias value to the noise-processed image.

5. The image pickup apparatus according to claim 4, wherein
   the bias value is determined on the basis of an image obtained by removing the offset noise from a dark-state image which is obtained by an image pickup process in a state in which the environment around the image pickup apparatus is dark.

6. The image pickup apparatus according to claim 2, wherein
   the image processing means obtains the object information in consideration of the offset noise on the basis of the shadow image and an illumination-light-using image which is obtained by picking up an image of the proximity object through the use of illumination light from the image pickup panel.

7. The image pickup apparatus according to claim 6, wherein
   the image processing means obtains the object information on the basis of a differential image between a noise-processed image which is obtained by removing the offset noise from the illumination-light-using image and a noise-processed image which is obtained by removing the offset noise from the shadow image.

8. The image pickup apparatus according to claim 6, wherein
   the image processing means obtains the object information on the basis of a differential image between an image which is obtained by adding a predetermined bias value to the noise-processed image obtained by removing the offset noise from the illumination-light-using image, and an image which is obtained by adding the bias value to the noise-processed image obtained by removing the offset noise from the shadow image.

9. The image pickup apparatus according to claim 8, wherein
the bias value is determined on the basis of a differential image between a dark-state image obtained by an image pickup process in a state where the environment around the image pickup apparatus is dark, and an initialized image obtained by the image pickup process in the state in which the image pickup devices are initialized.

10. The image pickup apparatus according to claim 6, wherein
the illumination light is display light from the image pickup panel.

11. The image pickup apparatus according to claim 6, wherein
a unit operation cycle is configured to include a process of obtaining the shadow image and a process of obtaining the illumination-light-using image, and the image pickup devices are initialized before the processes of obtaining the shadow image and illumination-light-using image, and
the image pickup control means perform control such that a process of obtaining the offset noise is performed only in an initialized state before any one of processes of obtaining the shadow image and obtaining the illumination light in each unit operation cycle.

12. The image pickup apparatus according to claim 6, wherein
a unit operation cycle is configured to include a process of obtaining the shadow image and a process of obtaining the illumination-light-using image, and the image pickup devices are initialized before the processes of obtaining the shadow image and the illumination-light-using image, and
the image pickup control means perform control such that a process of obtaining the offset noise is performed only in one initialized state in a plurality of unit operation cycles.

13. The image pickup apparatus according to claim 1, wherein
the image pickup devices in the image pickup panel are formed on a non-silicon (Si) substrate.

14. The image pickup apparatus according to claim 13, wherein
the non-silicon substrate is a glass substrate or a plastic substrate.

15. A display-and-image-pickup apparatus comprising:
a display image pickup panel including a plurality of display devices and a plurality of image pickup devices;
an image pickup control means for controlling the image pickup devices so as to obtain an offset noise by an image pickup process in a state in which the image pickup devices are initialized;
an image processing means for obtaining object information as information about at least one of the position, the shape and the size of a proximity object in consideration of the offset noise on the basis of a picked-up image which is obtained by picking up an image of the proximity object; and
a display control means for controlling the display devices so that the obtained object information is displayed on the display image pickup panel.

16. The display-and-image-pickup apparatus according to claim 15, wherein
the display devices and the image pickup devices in the display image pickup panel are formed on a non-silicon (Si) substrate.

17. An image pickup processing apparatus being a processing apparatus applied to an image pickup panel including a plurality of image pickup devices, the image pickup processing apparatus comprising:
an image pickup control means for controlling the image pickup devices so as to obtain an offset noise by an image pickup process in a state in which the image pickup devices are initialized; and
an image processing means for obtaining object information as information about at least one of the position, the shape and the size of a proximity object in consideration of the offset noise on the basis of a picked-up image which is obtained by picking up an image of the proximity object.

18. The image pickup processing apparatus according to claim 17, wherein
the image pickup devices in the image pickup panel are formed on a non-silicon (Si) substrate.

* * * * *

UNITED STATES PATENT AND TRADEMARK OFFICE
CERTIFICATE OF CORRECTION

PATENT NO. : 8,319,749 B2
APPLICATION NO. : 12/298094
DATED : November 27, 2012
INVENTOR(S) : Harada et al.

It is certified that error appears in the above-identified patent and that said Letters Patent is hereby corrected as shown below:

On the Title Page add Item 30:

Foreign Application Priority Data
Feb. 23, 2007 (JP)......................P2007-043317

Signed and Sealed this
Eleventh Day of June, 2013

Teresa Stanek Rea
*Acting Director of the United States Patent and Trademark Office*